US012745283B2

(12) United States Patent
Nezou et al.

(10) Patent No.: US 12,745,283 B2
(45) Date of Patent: Sep. 22, 2026

(54) LOW LATENCY FAIRNESS MANAGEMENT

(71) Applicant: CANON KABUSHIKI KAISHA, Tokyo (JP)

(72) Inventors: Patrice Nezou, Liffre (FR); Julien Sevin, Saint Aubin du Cormier (FR); Stéphane Baron, Le Rheu (FR)

(73) Assignee: CANON KABUSHIKI KAISHA, Tokyo (JP)

(*) Notice: Subject to any disclaimer, the term of this patent is extended or adjusted under 35 U.S.C. 154(b) by 362 days.

(21) Appl. No.: 18/571,115

(22) PCT Filed: Jun. 16, 2022

(86) PCT No.: PCT/EP2022/066519
§ 371 (c)(1),
(2) Date: Dec. 15, 2023

(87) PCT Pub. No.: WO2022/263610
PCT Pub. Date: Dec. 22, 2022

(65) Prior Publication Data

US 2024/0314836 A1 Sep. 19, 2024

(30) Foreign Application Priority Data

Jun. 18, 2021 (GB) ...................................... 2108832

(51) Int. Cl.
*H04W 74/00* (2009.01)
*H04W 72/121* (2023.01)
*H04W 74/0808* (2024.01)

(52) U.S. Cl.
CPC ..... *H04W 74/0808* (2013.01); *H04W 72/121* (2013.01)

(58) Field of Classification Search
CPC ........................ H04W 74/0808; H04W 72/121
See application file for complete search history.

(56) References Cited

U.S. PATENT DOCUMENTS

2013/0128798 A1 5/2013 Liu
2014/0169290 A1* 6/2014 Seok .................. H04W 74/006 370/329

(Continued)

FOREIGN PATENT DOCUMENTS

EP 3355602 A1 8/2018
WO 2017200998 A1 11/2017
WO 2022084275 A1 4/2022

OTHER PUBLICATIONS

Hiertz G R et al, The Evolution of Wireless LANs and PANs, Analysis of IEEE 802.11E for QoS Support in Wireless LANs, IEEE Wireless Communications, Dec. 2003, XP11107079.

(Continued)

*Primary Examiner* — Khai M Nguyen
(74) *Attorney, Agent, or Firm* — Canon U.S.A., Inc. IP Division

(57) ABSTRACT

A communication method in a communication network comprising a plurality of nodes connected to at least one access point node, the nodes being able to transmit data on at least one communication channel using a contention access method according to a contention parameter set, the method comprising, at a node, transmitting a given type of traffic during a dedicated service period allocated by the access point node, and switching, at the end of the dedicated service period, from a first contention parameter set to a second contention parameter set for contention access to the communication channel after a successful transmission of the given type of traffic during the dedicated service period.

28 Claims, 13 Drawing Sheets

(56) References Cited

U.S. PATENT DOCUMENTS

| | | | | |
|---|---|---|---|---|
| 2016/0219512 | A1* | 7/2016 | Asterjadhi | H04W 52/0212 |
| 2017/0202023 | A1* | 7/2017 | Zhou | H04W 74/0816 |
| 2019/0037595 | A1* | 1/2019 | Cherian | H04W 74/006 |
| 2021/0120552 | A1* | 4/2021 | Fang | H04W 72/0446 |
| 2021/0289516 | A1* | 9/2021 | Lee | H04W 16/14 |
| 2022/0240264 | A1* | 7/2022 | Chu | H04W 12/06 |
| 2023/0413176 | A1* | 12/2023 | Nezou | H04W 74/0866 |
| 2024/0049308 | A1* | 2/2024 | Xue | G06T 11/00 |
| 2024/0414758 | A1* | 12/2024 | Ciochina-Kar | H04W 74/0875 |
| 2026/0012977 | A1* | 1/2026 | Lu | H04W 48/12 |

OTHER PUBLICATIONS

Jinsoo Ahn, et al., Multi-User EDCA, IEEE Draft, May 19, 2016, Doc. No. IEEE 802.11-16/0673r1, XP68119564.

Stephane Baron, et al., Low-Latency Triggered TWT, IEEE Draft, Feb. 19, 2021, Doc. No. IEEE802.11-20/1843r3, XP68178804.

* cited by examiner

LOW LATENCY FAIRNESS MANAGEMENT

CROSS REFERENCE TO RELATED APPLICATION

This application is the National Phase application of PCT Application No. PCT/EP2022/066519, filed on Jun. 16, 2022. This application claims the benefit under 35 U.S.C. § 119(a)-(d) of United Kingdom Patent Application No. 2108832.3, filed on Jun. 18, 2021 and entitled "LOW LATENCY FAIRNESS MANAGEMENT". The above cited patent applications are incorporated herein by reference in their entirety.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The 802.11 family of standards adopted by the Institute of Electrical and Electronics Engineers (IEEE-RTM) provides a great number of mechanisms for wireless communications between stations.

With the development of latency sensitive applications such as online gaming, real-time video streaming, virtual reality, drone or robot remote controlling, better low latency and robustness requirements and issues need to be taken into consideration. For instance, 99.9% of latency sensitive packets should be delivered to the end equipment within a 2 ms latency.

Such problematic issues are currently under consideration by the IEEE 802.11 working group as a main objective to issue the next major 802.11 release, known as 802.11be or EHT for "Extremely High Throughput".

Low latency reliable services, LLRS, have been defined as targets of such main objective. LLRSs are services provided to a higher layer traffic stream that prioritize and deliver MSDUs (data units) within a worst-case latency budget with a given reliability such as e.g. a given packet delivery ratio (PDR) and low jitter.

LLRS traffic comprises several types of a traffic such as low latency traffic, latency sensitive traffic and time sensitive traffic. These types of traffic differ from one to another in that the requirements on their transmission, such as latency or reception time, are different. It remains that the transmission of these types of traffic is prioritized over not LLRS traffic.

An efficient QoS management in a BSS (Basic Service Set) is required to provide LLRS.

At the moment, EDCA (Enhanced Distributed Channel Access) ensures a QoS management in a BSS by defining traffic categories and four corresponding access categories that make it possible to handle differently high-priority traffic compared to low-priority traffic.

Implementation of EDCA in the nodes can be made using a plurality of traffic queues for serving data traffic at different priorities, to which a respective plurality of queue backoff engines is associated. The queue backoff engines are configured to use queue contention parameters, including respective queue backoff values, to contend for access to a composite channel, in order to transmit data stored in the associated traffic queues.

Thanks to the EDCA backoff procedure, the node can thus access the communication network using contention type access mechanism based on the queue backoff parameters, typically based on a computed queue backoff counter or value.

Traffic related to LLRS may comprises traffics related to one or more defined priorities, such that the existing EDCA mechanism is not sufficient as such to deal with traffic related to LLRS.

In order to prioritize traffic related to LLRS, one may consider prioritizing the stations having traffics related to LLRS over stations having the types other traffics, i.e. traffics unrelated to LLRS, to be transmitted.

Nevertheless, such prioritization should be contemplated while avoiding fairness issues: indeed, implementing a simple prioritization, without counter measures, may result in a situation where stations with traffic related to LLRS to send and station with traffic unrelated to LLRS to send do not access the communication medium at the same rate.

Therefore, measures ensuring the prioritization of traffic relating to LLRS while restoring fairness, between the stations, in accessing the communication medium, are needed.

SUMMARY OF INVENTION

It is a broad objective of the present invention to provide improved and fair communication methods and devices in a communication network, particularly when dealing with traffic related to LLRS. The communication network includes a plurality of nodes and an Access Point, all of the nodes sharing a physical medium of the communication network.

The present invention has been devised to overcome one or more foregoing limitations, in particular to provide communication methods that offer fair access to both stations, having traffic to send related to LLRS, and legacy stations, having traffic to send unrelated to LLRS. In other words, the invention seeks to overcome fairness issues when handling traffic to LLRS, whose access must be given priority over other traffic to ensure the proper functioning of the latency sensitive applications.

To do that, it is provided a communication method in a communication network comprising a plurality of nodes connected to at least one access point node, the nodes being able to transmit data on at least one communication channel using a contention access method according to a contention parameter set, the method comprising at a node:

- transmitting a given type of traffic during a dedicated service period allocated by the access point node,
- switching, at the end of the dedicated service period, from a first contention parameter set to a second contention parameter set for contention access to the communication channel after a successful transmission of the given type of traffic during the dedicated service period.

These embodiments propose to use a service period dedicated for the transmission of a given type of traffic, for example traffic relating to LLRS, also referred to as low latency traffic or latency sensitive traffic or time sensitive traffic. These embodiments thus restore fairness in the communication network through modifying the EDCA channel access scheme (for instance penalizing the EDCA parameters to reduce a probability to access the communication channel using this scheme) for those nodes that efficiently sent, during the service period, traffic related to the given type of traffic, e.g. related to LLRS.

Thus, fairness is restored by using a second set of EDCA parameters, upon the transmission of traffic of the given type of traffic during the service period.

Correspondingly, the invention also regards a communication device forming node in a communication network comprising a plurality of nodes connected to at least one access point node, the nodes being able to transmit data on at least one communication channel using a contention access method according to a contention parameter set, the communication device forming node comprising a microprocessor configured for carrying out the following steps:

- transmitting a given type of traffic during a dedicated service period allocated by the access point node,
- switching, at the end of the dedicated service period, from a first contention parameter set to a second contention parameter set for contention access to the communication channel after a successful transmission of the given type of traffic during the dedicated service period.

The device node has the same advantages as the method defined above.

Optional features of the invention are defined in the appended claims. Some of these features are explained here below with reference to a method, while they can be transposed into system features dedicated to any device node according to the invention.

In embodiments, the method may further comprise switching back to the first contention parameter set after a predetermined time period.

In other embodiments, the second contention parameter set reduces a probability for the node to access the communication channel through contention.

In variants, the method may further comprise receiving a beacon frame from the access point node, the beacon frame broadcasting network information about the communication network to the plurality of nodes, wherein a received beacon frame includes at least one second contention parameter set.

In some embodiments, the received beacon frame may include a plurality of second contention parameter sets associated with respective selection criterions, and the method further comprises, at the node:

- selecting a second contention parameter set from the plurality, to be applied for the switching, based on associated selection criterions.

In embodiments, the associated selection criterions may be requirement of the given type of traffic to be transmitted during the dedicated service period, such as a mean data rate or a maximum time interval In embodiments, the method may further comprise, before the transmission, negotiating with the access point node to be allowed to transmit data of the given type of traffic within the dedicated service period.

In embodiments, the switching may be conditional to the receiving of a command from the access point node during the negotiation, validating the switch using the second contention parameter set.

In some embodiments, the method may further comprise, during the negotiation:

- providing to the access point node, information relating to traffic queues having data of the given type of traffic awaiting to be sent at the node;
- wherein the received command from the access point node, take into consideration the received information relating to amounts of data of the given type of traffic awaiting to be sent at nodes of the network.

According to some embodiments, the method may further comprise

- providing, before the transmission, to the access point node, information relating to traffic queues having data of the given type of traffic awaiting to be sent at the node;
- receiving, during the negotiation, from the access point an information relating to a selected second contention parameter set to be applied for the switching, based on provided information from the nodes of the network during the negotiation.

In variants, the information relating to traffic queues may be a traffic identifier In embodiments, in the beacon frame, each second contention parameter set may be associated with a unique identifier, and the received information relating to a selected second contention parameter set to be applied may be an identifier associated with the selected second contention parameter set.

From the Access Point perspective, the present invention proposes a communication method in a communication network comprising a plurality of nodes connected to at least one access point node, the nodes being able to transmit data on at least one communication channel using a contention access method according to a contention parameter set, the method comprising at the access point node:

- initializing at least one second contention parameter set;
- transmitting information relating to the at least one second contention parameter set to at least one node,
- allocating a dedicated service period for transmission of a given type of traffic;
- wherein, after a successful transmission during the dedicated service period, the node switches, at the end of the dedicated service period, from a first contention parameter set to a second contention parameter set for contention access to the communication channel.

Correspondingly, an access point in a communication network comprising a plurality of nodes connected to the access point, the nodes being able to transmit data on at least one communication channel using a contention access method according to a contention parameter set, the access point comprising at least one microprocessor configured for carrying out the following steps:

- initializing at least one second contention parameter set;
- transmitting information relating to the at least one second contention parameter set to at least one node,
- allocating a dedicated service period for transmission of a given type of traffic;
- wherein, after a successful transmission during the dedicated service period, the node switches, at the end of the dedicated service period, from a first contention parameter set to a second contention parameter set for contention access to the communication channel.

The access point may thus efficiently control fairness in the network. Indeed, through the second contention parameter set, the access point may drive the nodes to adjust their EDCA access scheme when transmitting a given type of traffic, such as LLRS traffic.

Preferably, the second contention parameter set is based on a requirement of the given type of traffic to be transmitted during the dedicated service period.

Optional features of the invention are defined in the appended claims. Some of these features are explained here below with reference to a method, while they can be transposed into system features dedicated to any device node according to the invention.

In embodiments, the method may further comprise before the data transmission, negotiating with the node for allowing the node to transmit data of the given type of traffic within the dedicated service period.

In other embodiments, the method may further comprise:

collecting from the node information relating to traffic queues having data of the given type of traffic awaiting to be sent;

selecting a second contention parameter set, from the retrieved at least one contention parameter set, to be applied for the switching, based on predetermined selection criterions and the collection results.

In variants, the transmitted information relating to the at least one second contention parameter set may comprise the selected second contention parameter set.

In some embodiments, the transmitted information may comprise information relating to a plurality of second contention parameter sets each associated with an identifier, and the method further comprises, after the selection:

transmitting the identifier associated with the selected second contention parameter set In embodiments, the method may further comprise sending a command to the node during the negotiation validating or suspending the use of one of the second contention parameter sets, based on the selected contention parameter set.

In embodiments, the method may further comprise, during the negotiation:

collecting from the node information relating to traffic queues having data of the given type of traffic awaiting to be sent;

selecting a second contention parameter set, from the retrieved at least one second contention parameter set, to be applied for the switching, based on predetermined selection criterions and the collection results;

transmitting the selected second contention parameter set to the node.

In some embodiments, the transmitted information may comprise information relating to a plurality of second contention parameter sets, the method further comprising:

sending a command to the node during the negotiation validating or suspending the use of one of the second contention parameter sets, based on a received information relating to a second contention parameter set selected by the node In other embodiments, the predetermined period may be a defined by a LLEDCATimer value included within the second contention parameter set In variants, the given type of traffic may be a low latency traffic.

In some embodiments, the dedicated service period may be a Target Wake Time, TWT, service period.

In embodiments, the second contention parameter set may be based on a requirement of the given type of traffic to be transmitted during the dedicated service period According to some embodiments, information relating to traffic queues having data of the given type of traffic awaiting to be sent may be provided within a TWT information element in an uplink frame.

In embodiments, information relating to traffic queues having data of the given type of traffic awaiting to be sent may be provided within a downlink frame, such as a TSPEC frame or a TCLAS frame.

Another aspect of the invention relates to a non-transitory computer-readable medium storing a program which, when executed by a microprocessor or computer system in a device, causes the device to perform any method as defined above. The non-transitory computer-readable medium may have features and advantages that are analogous to those set out above and below in relation to the methods and devices.

At least parts of the methods according to the invention may be computer implemented. Accordingly, the present invention may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS

Figure 1:
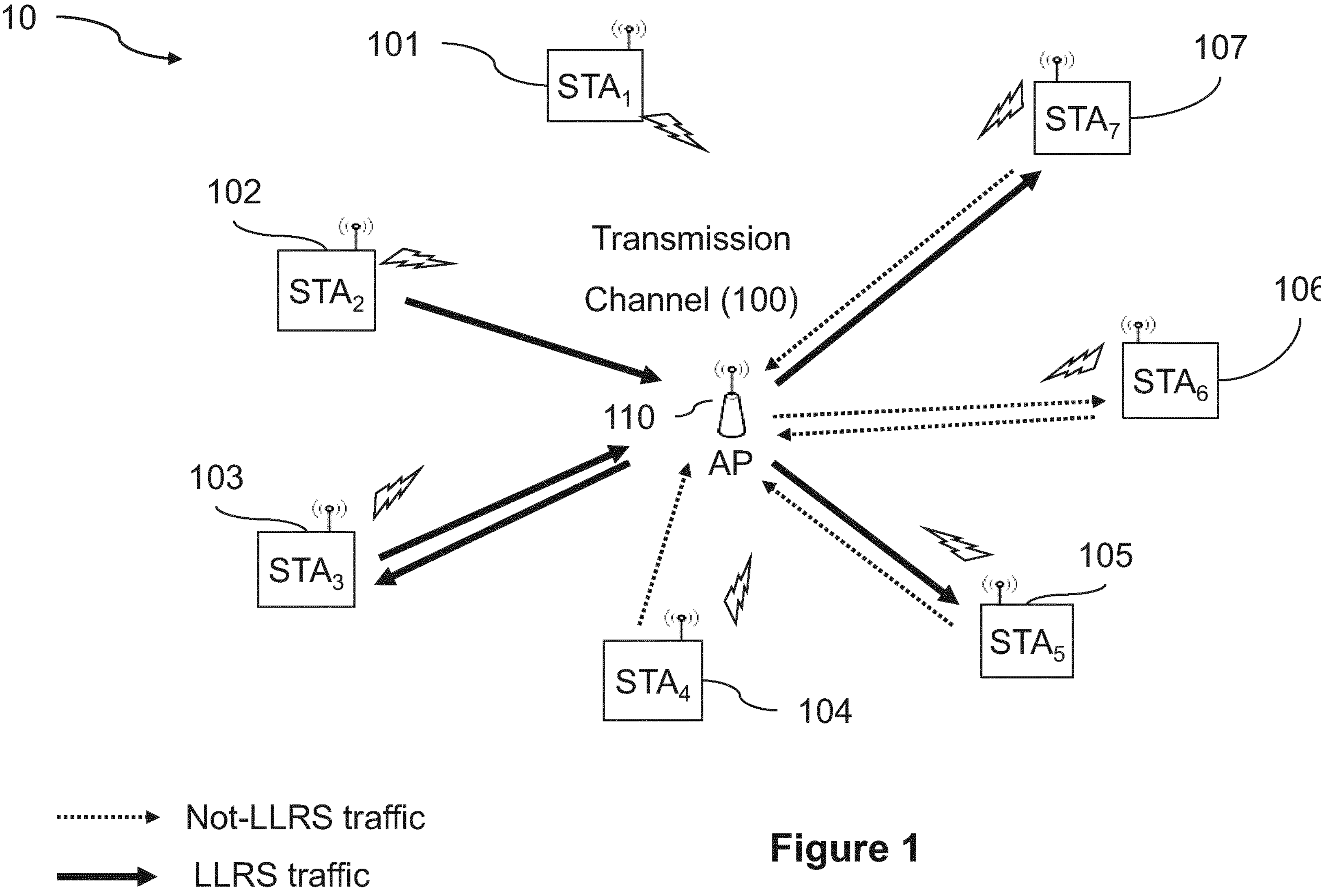
FIG. 1 illustrates a network environment in which embodiments of the invention may be implemented.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. A SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to a different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. A SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

An AP manages a set of stations that together organize their accesses to the wireless medium for communication purposes. The stations (including the AP) form a service set, here below referred to as basic service set, BSS (although other terminology can be used). A same physical station acting as an access point may manage two or more BSSs (and thus corresponding WLANs): each BSS is thus uniquely identified by a specific basic service set identification, BSSID and managed by a separate virtual AP implemented in the physical AP.

FIG. 1 illustrates an exemplary network environment 10 in which embodiments of the invention may be implemented.

Each communication station 101, 102, 103, 104, 105, 106 and 107, also referred to as nodes and requesting non-AP stations, registers to a central station or access point (AP), also referred to as AP node, 110 during an association procedure. During the association procedure, the AP assigns a specific Association IDentifier (AID) to each requesting non-AP station. For example, the AID, e.g. a 16-bit value uniquely identifying the non-AP station, is used to identify the stations in frames exchanged. The AP 110 and the associated non-AP stations 101, 102, 103, 104, 105, 106 and 107 may form a basic service set (BSS) or an extended service set (ESS).

Once associated with the BSS, the communication stations 101, 102, 103, 104, 105, 106 and 107, 110 exchange data frames over a radio transmission channel 100 of a wireless local area network (WLAN), under the management of the AP 110. The radio transmission channel 100 is defined by an operating frequency band constituted by a single channel or a plurality of channels forming a composite channel.

Non-AP stations may also communicate directly via a direct wireless link (DiL for direct link), i.e. without the intervention of the AP 110 as relay of their messages. Exemplary situation of direct communications includes the presence of peer-to-peer (P2P) transmissions between non-AP stations having the same primary channel.

When communicating over the radio transmission channel 100, the stations 101, 102, 103, 104, 105, 106 and 107, 110 compete one against the other to gain access to the transmission channel 100 using EDCA (Enhanced Distributed Channel Access) contention in order to be granted a transmission opportunity (TxOP) and then transmit data frames. Such scheme may also be referred to as single user (SU) scheme.

EDCA (Enhanced Distributed Channel Access) defines traffic categories, also referred to as traffic classes, and four corresponding access categories that make it possible to handle differently high-priority traffic compared to low-priority traffic. The terms "traffic" and/or "traffic stream(s)" as used herein, are defined as a data flow and/or stream between wireless devices.

The traffic classes, identified using a Traffic Identifier (TID) taking values in the range 0 to 7, are mapped to the defined four ACs. Thus, the nodes use serval traffic queues, for example each being dedicated for serving traffic of a given AC, for transmitting data according to different priorities.

Implementation of EDCA in the nodes can be made using a plurality of traffic queues for serving data traffic at different priorities, to which a respective plurality of queue backoff engines is associated. The queue backoff engines are configured to use queue contention parameters, including respective queue backoff values, to contend for access to a single channel or a composite channel, in order to transmit data stored in the associated traffic queues.

Thanks to the EDCA backoff procedure, the node can thus access the communication network using contention type access mechanism based on the queue backoff parameters, typically based on a computed queue backoff counter or value.

The queue backoff value is obtained, for each traffic queue, using the values of the associated contention parameters.

The EDCA parameter set, also referred to as contention parameter set, comprises, for each traffic queue, i.e. for each AC, the values of a set of contention parameters, such as the parameters CW, CWmin, CWmax, AIFS, and Backoff value. Such queue contention parameters are then used to set the relative priority to access the medium for the traffic queues at the non-AP station. Some of those parameters have usually a fixed value (e.g. CWmin, CWmax, and AIFS), while the two other parameters (CW and backoff value) evolves over time and medium availability.

For each traffic queue associated with a given AC, contention parameters set are chosen in order to mirror the priority of the given AC.

The non-AP station computes the queue backoff value as being equal to a random value selected in range [0, CW]+AIFS, where CW is the current value of the CW for the traffic queue considered (as defined in 802.11 standard and updated for instance according to some embodiments of the invention as described in step 1080 below), and AIFS is an offset value which depends on the AC of the traffic queue (all the AIFS values being defined in the 802.11 standard) and which is designed to implement the relative priority of the different ACs. CW is a congestion window value that is selected from selection range [CWmin, CWmax], where both boundaries CWmin and CWmax depends on the Access Category considered.

The stations may also use a multi-user (MU) scheme in which a single station, usually the AP 110, is allowed to schedule a MU transmission, i.e. multiple simultaneous transmissions to or from other stations, during a TxOP granted in the wireless network. One implementation of such a MU scheme has been, for example, adopted in IEEE 802.11ax amendment standard, as the Multi-User Uplink and Downlink OFDMA (MU UL and DL OFDMA) procedures.

Nowadays, Low Latency Reliable Services, LLRS, are increasingly developing within the communication networks, as the one illustrated in FIG. 1. There are several types of LLRS, whose traffic, also referred to as LLRS traffic, comprises low latency data and/or latency sensitive data, which are provided to a higher layer traffic stream that prioritize and deliver related data traffic with a given reliability, for example with a given Packet Delivery Ratio (PDR), and low jitter, in a worst-case latency budget.

There are several types of LLRS whose LLRS traffic that can be, for example, classified as follows:

- LLRS traffic Type 1, also referred to as latency sensitive or time sensitive: it is a traffic with low data rate, therefore consuming very small fraction of resources. the effect of this type of LLRS traffic on other traffics is small. For example, such LLRS traffic may be gaming traffic. In such a case, such LLRS traffic of type 1 are rarely the source of congestion, which is usually caused by regular traffics.
- LLRS traffic Type 2, also referred to as low latency data: it is a traffic with high data rate, therefore needing a large fraction of resources. Such type of LLRS traffic may have big effect on other traffics. For example, such LLRS traffic may be Virtual Reality-VR traffic. In such a case, congestion may be caused by low latency traffic.

In this context, LLRS traffic, also referred to as low latency traffic, and non LLRS traffic coexist within the network. LLRS traffic may comprise traffic of several access categories or several traffic categories. The notion of LLRS traffic, which were recently introduced in the latest versions of the 802.11 standard, may not be handle by the legacy stations. In the rest of this document, the term legacy station is used to designate the stations which are not able to handle LLRS traffic and the stations which does have any LLRS traffic to transmit.

The non-AP stations may represent various devices such as gaming client, augmented/virtual reality headset, smartphones, wireless display and some of them have to exchange (i.e. transmit or/and receive) low-latency or LLRS traffic over time. LLRS traffics and not-LLRS traffics, which coexist within the WLAN 10, do not have the same QoS requirements. Thus, LLRS traffics have more constrained requirements, for instance regarding PDR, jitter and latency.

To prioritize LLRS traffic over non-LLRS traffic within a BSS, it is proposed to reserve a period of time, during which LLRS traffics are prioritized over the non-LLRS traffic. In other words, during this reserved period, the medium access of some of the legacy stations may be suspended, in order to promote the medium access of the stations having LLRS traffic to transmit. According to some embodiments, during the reserved period of time, only LLRS traffic are exchanged.

Figure 2:
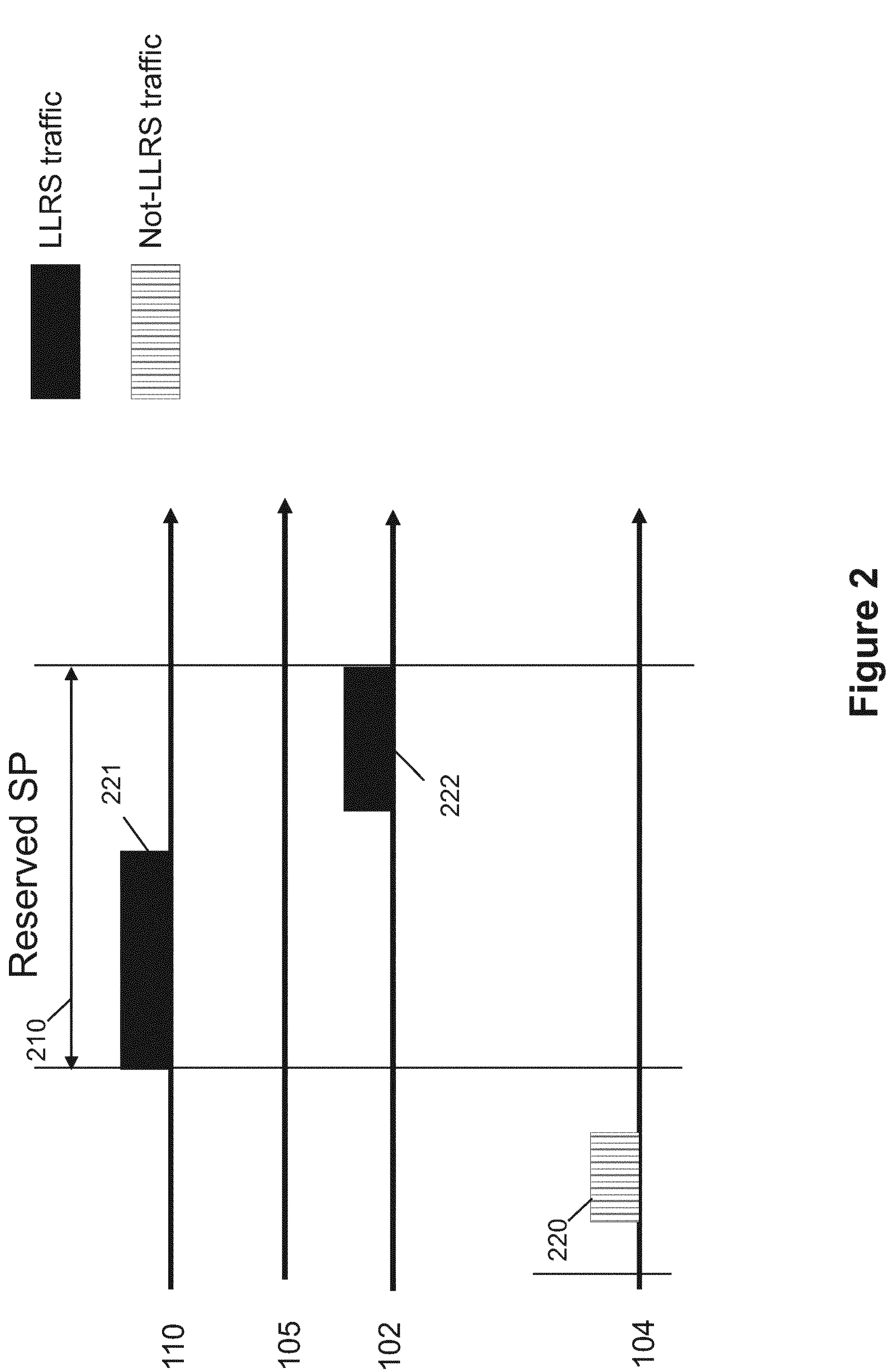
FIG. 2 illustrates use of a service period (SP) to prioritize LLRS traffic over not-LLRS traffic within a BSS.

An example of a service period (SP) is reserved for LLRS traffic, also referred to as LL SP, is illustrated by FIG. 2.

In the illustration, the AP 110 schedules a reserved service period 210 for LLRS traffic, LL SP. The AP 110 may announce the starting time and the ending time of the reserved LL SP. The reserved LL SP 210 may be fully dedicated to LLRS traffic exchange, or in variant may allow both LLRS traffic and non-LLRS traffic. In the illustrated example, the reserved service period is a reserved LL SP that is to say is dedicated to LLRS traffic.

In the illustrated example, a LLRS traffic exchange occurs during the reserved LL SP. The LLRS traffic exchange may comprise one or more frame exchanges involving the AP and a non-AP station, for example, as illustrated, a downlink frame 221 sent by the AP to one of the non-AP station, e.g. 102, and an uplink frame 222 sent by the non-AP station 102 to the AP.

Before and after the reserved LL SP non-LLRS traffic may be exchanged. As illustrated, previously to the reserved service period, the non-AP station 104 gains access to the wireless medium 100 and transmits a non-LLRS traffic 220 to the AP. Next, AP 110 transmits LLRS traffic 221 to non-AP station 105 and then receives other LLRS traffic 222 from non-AP station 102.

According to some embodiments, the exchanged LLRS traffic and non LLRS traffic may comprise one or more frame exchanges involving at least two non-AP stations, for example P2P LLRS traffic between two non-AP stations, e.g. 102 and 105 (not represented).

To reserve such LL SP, in some embodiments, Target Wake Time (TWT) mechanism may be used by the AP, therefore defining a LL TWT SP.

TWT is a Wi-Fi power-saving mechanism, introduced since 802.11b, in which the stations sleep between the receiving of downlink frames, such as the beacon frames and/or management frames, and which wake up when they have data to transmit (at any time as the AP is always up).

Thus, the TWT allows the AP to manage the activity within the network, in order to minimize competition between the station for accessing the medium, and to optimize the amount of time during which the stations needs to be awake.

In other words, the TWT enables devices to determine when and how frequently they should wake up to send or receive data. Besides, the TWT allows an AP to manage activity in the network, in order to minimize medium contention between STAs, and to reduce the required amount of time that a STA in the power-save mode needs to be awake. Thanks to this mechanism, a STA can doze except during the TWT service period, TWT SP, intervals.

TWT SP may be reserved for transmission of data involving several non-AP stations, e.g. for several non-AP stations having traffic of a same traffic category, or having LLRS traffic.

TWT SPs can be of two types, either an individual TWT or a broadcast TWT.

An individual TWT SP is negotiated between an AP and a STA, and comprises a specific time or set of times at which the STA is expected to be awake in order to exchange frames with the AP.

Such negotiation may be initiated by a TWT requesting station, which may be either the AP or the STA by sending a request to the AP.

The TWT responding station, either the AP or non-AP station, respectively proposes a TWT SP, or a positive or negative response for taking part of the proposed TWT SP.

Figure 3:
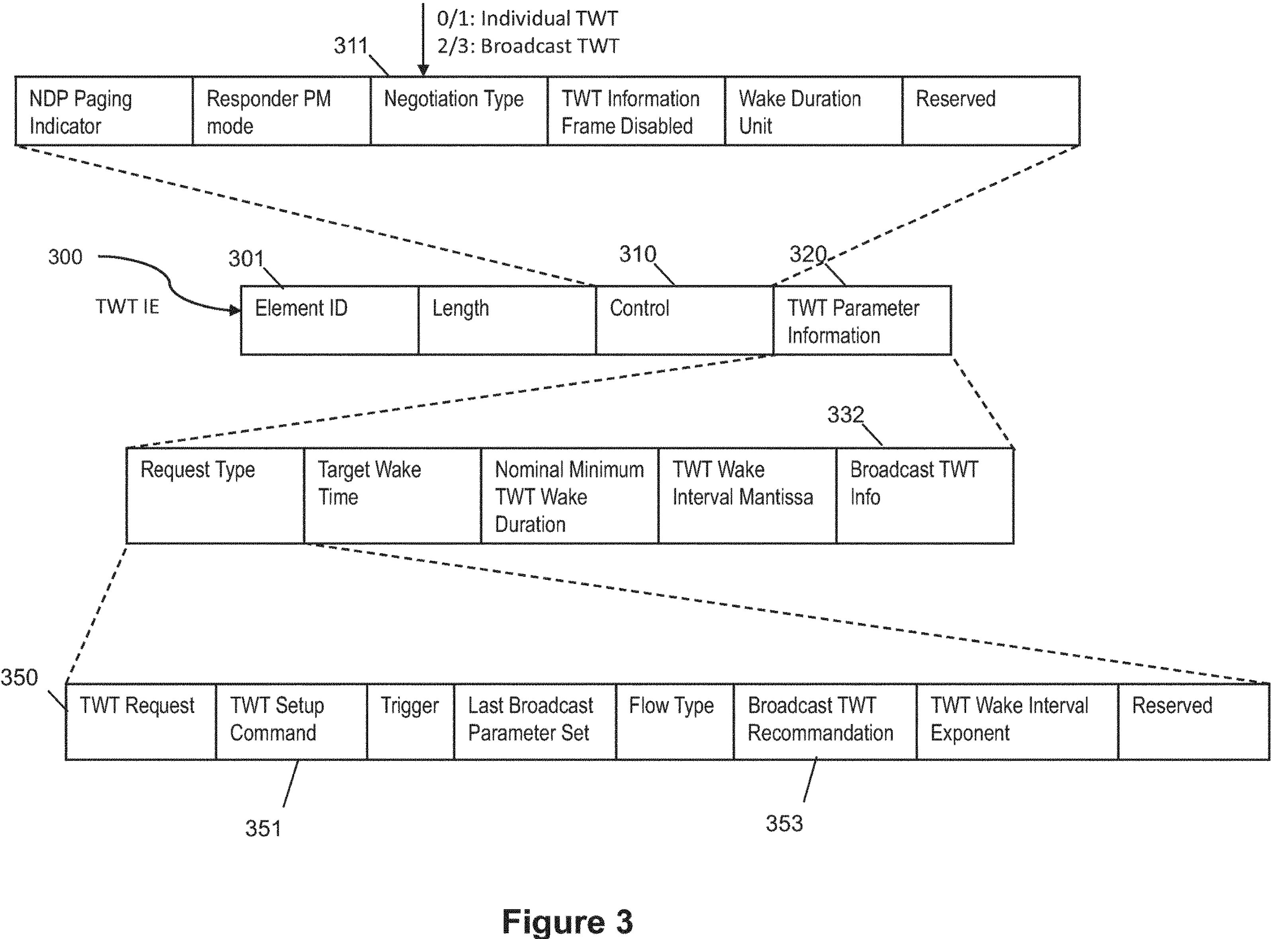
FIG. 3 illustrates a format of a conventional TWT Information Element (IE)

During negotiations, the AP and the non-AP station transmit to each other a special information element, a conventional TWT Information Element, TWT IE, e.g. as illustrated in FIG. 3, which contains TWT parameters. Such TWT IE can be interpreted as request, suggestion, demand, alternation, acceptation, dictation, or rejection, according to the originator.

Either the AP or the STA can tear down the TWT by transmitting a TWT Teardown frame.

The broadcast TWT is similar to an individual TWT except that the specific time or set of times are not negotiated between stations (the AP and the non-AP stations) but directly broadcast by an AP, referred to as TWT scheduling AP, to multiple non-AP stations, e.g. using a beacon frame.

In that case, the AP uses another mechanism based on a traffic indication map, TIM, element to indicate the set of STAs towards which the AP plans to transmit downlink (DL) data or which are going to be triggered by the AP for uplink traffic. If a STA is not indicated in a TIM element, it means that it will not be solicited within the next TWT SP.

For both individually agreed TWT SP and broadcast TWT SP, the final arrangement between the AP and the non-AP stations regarding the TWT, also referred to as TWT agreement, is thus obtained, and is provided to all the non-AP stations. Such TWT agreement defines details regarding the TWT in which the non-AP stations is involved, e.g. the time(s) at which the non-AP stations have to wake up. The direction of the transmissions allowed during the TWT SP, i.e. downlink or uplink, may also be specified.

All details regarding the TWT (e.g. information exchanges during the negotiation in case of individual TWT, and dictation in case of broadcast TWT) may be provided within a conventional TWT Information Element (IE), the format of the conventional TWT IE 300 being illustrated in FIG. 3. Such TWT IE may be conveyed in any uplink or downlink frames exchanged between the AP and the non-AP stations. According to some embodiments, the TWT IE may be comprised within the beacon frame and/or a management frame.

The conventional TWT IE 300 comprises an Element ID field 301, a Control field 310 and a TWT Parameter Information field 320.

The Element ID field 301 comprises a TWT identifier for identifying the TWT defined by the TWT parameters conveyed within the TWT Parameter Information field 320. According to some embodiments, each TWT identifier uniquely identify a given TWT.

The Control field 310 includes information relating to the type of TWT, meaning whether the TWT is an individual TWT or a broadcast TWT.

According to some embodiments, the “Control” field 310 comprises a “Negotiation Type” field 311 indicating the type of the TWT, either individually or broadcast. According to the value of the “Negotiation Type” field 311, the devices may be configured to detect a broadcast TWT. According to some embodiments, the MSB bit of the “Negotiation Type” field 311 may be used to indicate the type of TWT. The MSB bit may be set up in order to takes discrete values among the set {0;1;2;3}, values 0 and 1 announcing individual TWT and values 2 and 3 announcing broadcast TWT.

Parameters relating to the TWT, meaning the specific time, or set of times indicating when the devices should be awake, are indicated within the TWT Parameter Information field 320.

In the illustrated example, the MSB bit of this field 311 may be set to 2 when the AP promotes a broadcast TWT. In this case, next, the TWT scheduling AP sets the “TWT Request” subfield 350 to 0 and the TWT Setup Command subfield 351 as “Accept” to announce the next TWT SP, as “Alternate” to announce the next TWT SP with a new set of TWT parameters and as “Reject” to tear down a broadcast TWT, the ending date being identified in the “Broadcast TWT Persistence” subfield 343. In case of a broadcast TWT, the conventional TWT IE 300 further includes a broadcast TWT info field 332 defining the set of TWT parameters. Each broadcast TWT info field is identified by a “Broadcast TWT ID” field 342 allowing an AP to schedule multiple sets of broadcast TWT SPs with different sets of TWT parameters.

A STA may request to become a member of a broadcast TWT agreement by transmitting a frame to its associated AP that contains a conventional TWT IE 300 with the “Negotiation Type” subfield 311 set to 3 and the “TWT Setup Command” field 351 set to “Request TWT” or “Suggest TWT” or “Demand TWT”. The attached TWT Parameter set, i.e. the broadcast TWT info field 332, indicates the Broadcast TWT ID of the broadcast TWT that the STA is requesting to join.

The “Broadcast TWT Recommendation” field 353 is used in the 802.11 standard to advise STAs to send one among PS-Poll, QOS Null, BQR or BSR frames when they are solicited by the AP. This field 353 only conveys a recommendation, such that STAs are free to use any other kinds of frames.

In the illustrated example, the MSB bit of the “Negotiation Type” field 311 may be set to 0 when the AP proposes an individual TWT. In this case, during the negotiation period, the STA may respond to AP regarding the proposed individual TWT with a frame including a TWT IE, in which the "Negotiation Type" field 311 is set to 1. In both cases, the TWT parameters are specified within the broadcast TWT info field 332. Further, in both cases, the "TWT Setup Command" field 351 set to "Suggest TWT" or "Demand TWT", during the negotiation. Of course, according to some embodiments, the non-AP station may also reject the proposed TWT.

According to some embodiments, TWT agreement may define several periodical TWT SPs.

According to some embodiments, non-AP stations may be involved in more than one TWT agreement.

According to some embodiment, TWT SP may be reserved for the transmission of some type of data. 802.11 stations support a traffic prioritization, as explained hereinbefore, such that data may be classified according to eight priority of traffic class, mapped to four access categories.

According to some embodiments, TWT SP may be dedicated to the transmission of traffic relating to one or more given TIDs. According to some embodiments, the TWT SP may be dedicated to transmission of LLRS traffic.

Therefore, it is proposed to use the TWT mechanism in order to define service periods during which only stations, having LLRS traffic to transmit, are awake to transmit LLRS traffic using the radio transmission channel 100. In this case, the reserved service period may be defined as a protected Target Wake Time (TWT) service period, also referred to as TWT SP or LL TWT SP hereinafter.

Nevertheless, using service periods dedicated for the transmission of a given type of traffic may impact the fairness in accessing the medium among the non-AP stations, particularly between the non-AP stations having data traffic of the given type and legacy stations, e.g. stations not having LLRS traffic to transmit or stations not capable of using service periods dedicated for the transmission of a given type of traffic.

In the context of LLRS, it is sought to ensure fairness among non-AP stations having LLRS traffic and non-AP stations having no LLRS traffic, by using a TWT SP dedicated to LLRS traffic, ensuring a prioritized delivery over this type of traffic, while proposing mechanisms to help the AP to implement a fairness policy.

The invention is described hereinafter in relation with the prioritization of LLRS traffic. Of course, it may be transposable to any type of traffic, whose transmission to the AP shall be prioritize over the over types of traffic.

To achieve that, it is contemplated to implement fairness policies, and it is therefore proposed to update a first EDCA parameter set used by a station after successfully transmitting LLRS traffic of a given traffic queue through a dedicated service period, with a second EDCA parameter set. The second EDCA parameter set preferably reduces the probability for the node, during a predetermined time period, to subsequently access successfully a channel by contention for further transmissions.

The second EDCA parameter set, comprising values of contention parameters for each traffic queue, is then used by the node, therefore modifying the probability of accessing the medium for the traffic queues of the node.

The invention therefore proposes several mechanisms helping the AP to implement a fairness policy taken into consideration, reserved LL TWT SP, dedicated to LLRS traffic. The scope of the present invention is limited to the mechanisms helping the AP to apply the fairness policy, but does not cover the fairness policy as such. As mentioned hereinbefore, the fairness policy consists in modifying the EDCA parameters during predetermined periods, in order to pilot the probability for the node to access the medium. The way how the second EDCA parameter sets are determined is not covered by the present invention.

According to some embodiments, the second EDCA parameter set may be preferably provided by the AP which has an overview of the network and may be adjusted based on information local to a given node (for instance the amount of data transmitted, or the current contention window).

According to some embodiments, one or more second EDCA parameter set may be provided by the AP, and then selected by the station, according to a selection criterion, e.g. mean data rate at the station and/or the maximum time interval at the station. Maximum time interval may be defined as the maximum time period during which the non-AP station shall access the medium for transmitting the data contained in the traffic queues, otherwise the data to be transmitted will become obsolete. The maximum time interval is therefore used by the AP in the transmission scheduling, in particular to determine when the non-AP station shall access the medium.

For instance, the first EDCA parameter set is substituted with the second EDCA parameter set.

According to some embodiments, in response to transmitting data related to a given type of traffic through EDCA contention, and at the reserved period for the transmission of the given type of traffic, the second EDCA parameter set is used for subsequent EDCA access, to reduce the probability of the non-AP station. The use of the second EDCA parameter set may be for a predetermined period of time.

According to some embodiments, the value of such predetermined time period may be an EDCA parameter, i.e. a contention parameter, and comprised within the second EDCA parameter set.

Such predetermined period may be counted by a dedicated timer, at the non-AP station. Thus, at the non-AP, several timers may be used simultaneously, each being associated with a traffic queue using a second EDCA parameter set.

Besides, the second EDCA parameter set has at least one contention parameter having a different value from the corresponding contention parameter in the first EDCA parameter set. In other words, according to some embodiments, the second EDCA parameter set may modify the probability of accessing the medium of at least one traffic queue of the considered node.

According to some embodiments, the non-AP station modifies at the end of the dedicated service period, in response to successfully transmitting data related to a given type of traffic during the dedicated service period, at least one parameter of the first EDCA parameter set by the corresponding parameter of the second EDCA parameter set.

Another aspect of embodiments of the present invention takes place at the AP side to efficiently drive the stations in modifying the used EDCA parameter set. For example, the AP may select second EDCA parameter sets to be used by the non-AP stations, upon each station successfully transmitting data of the given type of traffic.

In some embodiments, the AP provides several second EDCA parameter sets to the stations, and according to the embodiments, either station or the AP selects the second EDCA embodiments set to be applied upon the transmission of data related with the given type of traffic.

Figure 4:
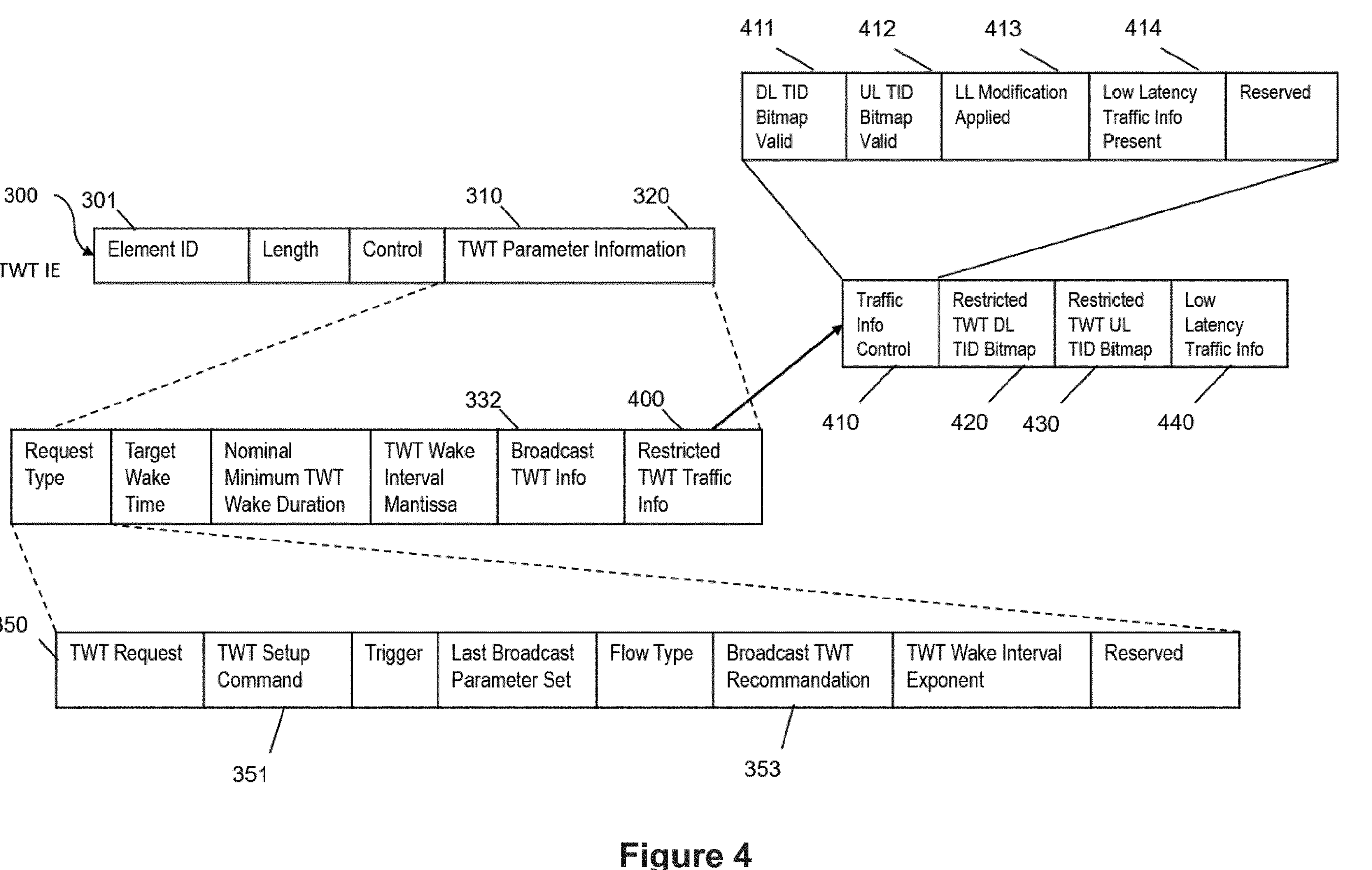
FIG. 4 illustrates a format of the TWT Information Element (IE) containing information related to the modification parameters according to some embodiments of the present invention.

FIG. 4 illustrates different embodiments for the format of the TWT Information Element (IE) containing information related to the modification parameters in the context of the invention.

To support the transport of the second EDCA parameter set(s), also referred to as LL modification parameters, the TWT Information element is enhanced by adding optional fields that are present or not depending on the embodiment described in the following FIGS. 6 to 12.

Further to the fields described in reference to FIG. 3, according to some embodiments of the invention, the enhanced format of TWT IE comprises a Restricted TWT Traffic Information field 400, an optional field, conveying information relating to the contention parameters, i.e. the second EDCA parameter set, to be used when dealing with LL traffic.

The "Traffic Info Control" field 410 contains a set of bits indicating the presence of associated fields within the Restricted TWT Traffic Information field 400:

- The DL TID Bitmap Valid bit 411 indicates if the Restricted TWT DL TID Bitmap field 420 has valid information. When the value of DL TID Bitmap Valid bit 411 is set to 0, it indicates that DL traffic of all TIDs is identified as LLRS traffic, and the Restricted TWT DL TID Bitmap field 420 is reserved.
- The UL TID Bitmap Valid bit 412 indicates if the Restricted TWT UL TID Bitmap field 430 has valid information. When the value is set to 0, it indicates that UL traffic of all TIDs is identified as LLRS traffic, and the Restricted TWT UL TID Bitmap field 430 is reserved.
- The Restricted TWT DL 420, UL TID Bitmap 430 subfields specify which traffic queues, identified using associated TID(s), are identified by the TWT scheduling AP or the TWT scheduled non-AP stations as LLRS traffic, for example as latency sensitive traffic streams, in the downlink and uplink direction, respectively. A value of 1 (or 0) at bit position k in the bitmap indicates that TID k is (or is not) classified as LLRS traffic.

As explained, the second EDCA parameter set, comprises several sets of values of contention parameters, each set being associated with a given traffic queue, i.e. a given AC.

Figure 5:
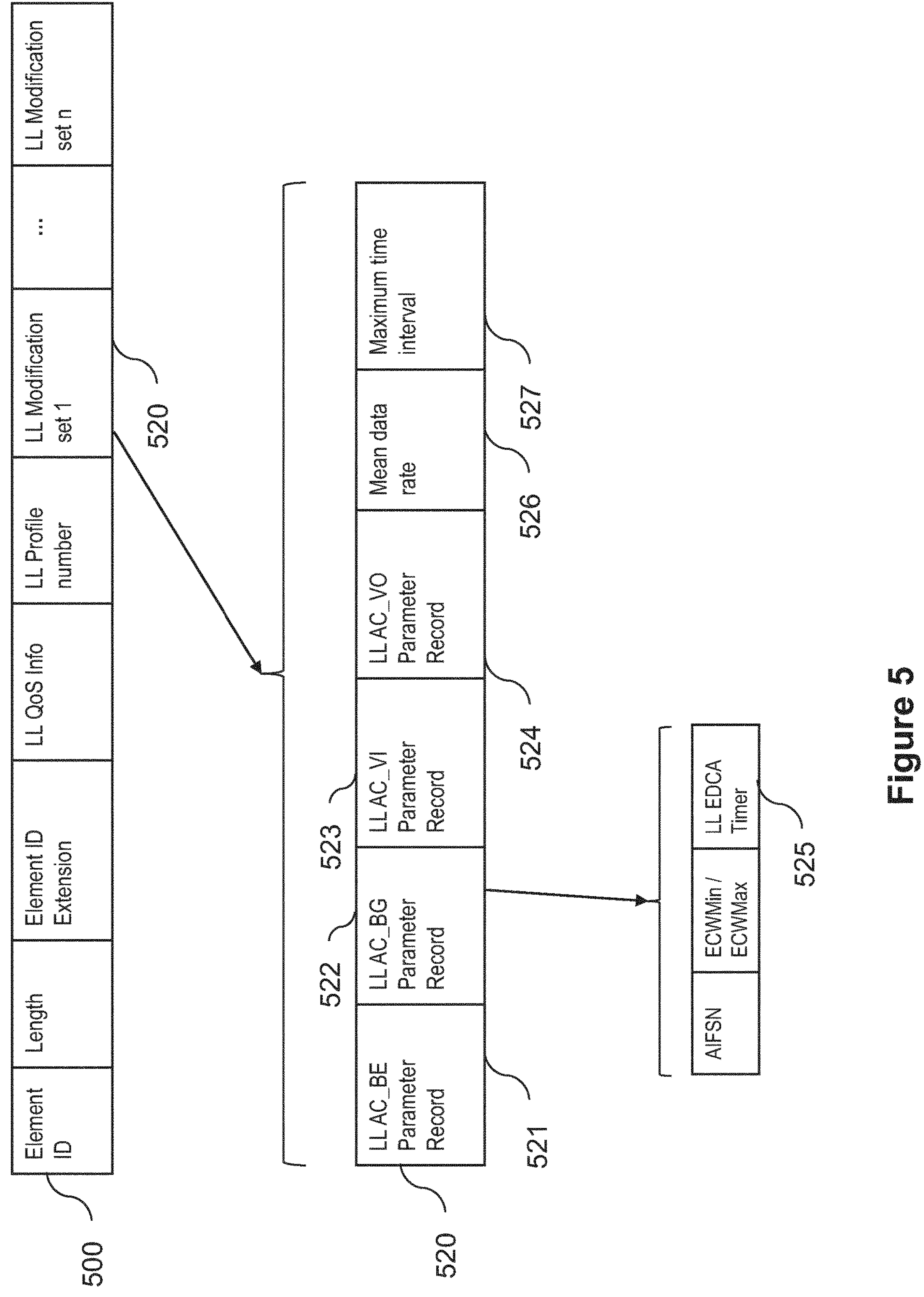
FIG. 5 illustrate exemplary structures of a Low Latency (LL) information element to transmit the modified EDCA parameters values according to some embodiments of the present invention.

The second EDCA parameter set may be applied by the given station under certain conditions during the service period, e.g. upon a successful transmission of LLRS data contained within the given traffic queue to the AP during a service period dedicated for the transmission of LLRS traffic, LL TWT SP. Thus, according to some embodiments, the enhanced TWT IE format further comprises the following additional fields indicating when to apply the second EDCA parameter set:

- The "LL Modification Applied" bit 413 indicates if a second EDCA parameter set has to be applied upon a successful transmission of LLRS traffic during a LL SP. When the value is set to 0, the second EDCA parameter set is not applied to the non-AP stations.
- The "Low Latency Traffic Info Present" bit 414 indicates if the "Low Latency Traffic Info" field 440 has valid information, has valid one or more second EDCA parameter set. When the value is set to 0, it indicates that the "Low Latency Traffic Info" field 440 is reserved.
- The "Low Latency Traffic Info" field 440 contains one or multiple second EDCA parameter sets, as illustrated in FIG. 5. It provides at least one second EDCA parameter set to be applied upon a successful transmission during the Low Latency TWT SP. According to some embodiments, the second EDCA parameters is applied at the end of the LL TWT SP. According to some embodiments, in order to minimize the overhead, this field may contain an identifier, uniquely identifying an associated second EDCA parameter set. When several second EDCA parameter sets are provided, the selection of the EDCA parameter set to be applied may be performed at the station or at the AP, according to one or more criterion, referred to as selection criterion hereinafter.

According to embodiments of the invention, the one or more second EDCA parameter sets, comprised in the "Low Latency Traffic Info" field 440, may be contained in an Information Element, referred to as a Low Latency Information Element, LL IE. An example of a structure of the LL IE is illustrated in FIG. 5, to be used for transmitting the one or more second EDCA parameter sets, according to some embodiments of the invention. Further, such LL IE may also be used, according to some embodiments, to provide, for each initializing values of the dedicated timer counting the predetermined time period, during which the second EDCA parameter set may be applied. In the context of LLRS traffic, the timer, implemented at each non-AP station using a second EDCA parameter set, is referred to as LLEDCA-Timer [AC]. The illustrated LL IE 500 is sent by the AP within a management frame, preferably within a Beacon frame. According to some embodiments, such frame is sent by the AP before the negotiation of the LL TWT SP.

The LL IE 500 includes one or multiple second EDCA parameter sets 520.

The second EDCA parameter set 520 contains, for each traffic queue, values of EDCA parameters, i.e. contention parameters, 521, 522, 523, 524 to be used by the non-AP stations upon a successful transmission of LLRS traffic during the LL TWT SP.

Thus, when applying the second EDCA parameter set 520, the nodes modifying the current values of all the traffic queues with the new values contained within the fields 521, 522, 523, 524.

According to some embodiments, the second EDCA parameter sets may be applied at the end of the LL TWT SP.

LL IE 500 further comprises a subfield 525 specifying the LLEDCATimer[AC] value for each traffic queue.

According to some embodiments, each subfield 521, 522, 523, 524, associated with the traffic queues at the nodes, includes new AIFSN value, new ECWmin value and a new ECWmax value.

According to some embodiments, for at least one AC i.e. traffic queue, among AIFSN, ECWIN and ECmax values of the second EDCA parameters, at least one of them, may be different from the respective AIFSN, ECWIN and ECmax values of the first EDCA parameter set.

According to some embodiments, each subfield 521, 522, 523, 524 may comprise penalty values, for a corresponding traffic queue, to be apply for respective AIFSN, ECWIN and ECmax values of the first EDCA parameter set, to obtain a second EDCA parameter set.

According to some embodiments, the AIFSN value in at least one of the subfields 521, 522, 523, 524 of the second EDCA parameter set can be set to a reserved value '0'. When for a given traffic queue, the AIFSN value of the associated subfield among the subfields 521, 522, 523, 524 is updated to '0' using the second EDCA parameter set, the traffic queue is forbidden to access the medium. When the AIFSN value is set to '0' within all the subfields 521, 522, 523, 524, then the non-AP station applying these AIFSN values is forbidden to access the medium.

According to some embodiments, the LL IE 500 may contain an indication, associated to each second EDCA parameter set, whether the second EDCA parameter set penalize or not the non-AP stations in accessing the medium for transmitting data of the concerned traffic queue.

When using the second EDCA parameter set applying to all the traffic queues of a given non-AP station, dedicated timers are used, for each traffic queue, independently initialized with the associated LLEDCATimer[AC] value.

The LL IE 500 may further comprise the subfield "Mean data rate" 526 and/or the subfield "Maximum interval" 527, whose values may be used as selection criterion, used by the non-AP station, of a second EDCA parameter set when several EDCA parameter sets are provided by the AP.

According to some embodiments, additional subfields may be comprised in the LL IE 500 corresponding to some others traffic characteristics which can be used for selecting a second EDCA parameter set. The use of such selection criterion will be better understood in the following described embodiments.

Thus, the transport of LLRS traffics using the LL TWT feature, as described, is contemplated by the IEEE 802.11 working group.

The LL TWT feature allows an AP from a network cell to reserve a transmission opportunity for the transmission of mainly LLRS traffics. The LL TWT give more opportunities for STAs to transmit LLRS traffics and other traffics if no more LLRS traffic data has to be sent.

In that case, fairness issues appear for legacy devices and any other STAs that don't have any LLRS traffics to transmit. In order to meet the QoS requirement, the AP can use multiple means to ensure the fairness among all STAs of the 802.11 network.

It is proposed a way to adapt, define, or amend, EDCA parameter set, when considering fairness issues. Therefore, invention enables a fairness policy to be managed by the AP, notably by implementing mechanisms at the AP side and at the STA side. In particular, a specific information element, as described in FIG. 5, is used by the AP to provide EDCA parameter set(s) to be used to update a currently used EDCA parameter set, referred to as hereinafter a first EDCA parameter set.

In order to implement a fairness policy that takes into consideration the multiple profiles of LLRS traffics, it is proposed multiple embodiments applying EDCA parameter set updating according to some conditions, e.g. local, i.e. at the non-AP station, or global, at the network level. It also depends on the bandwidth consumption of the non-AP station and the medium access privilege gained by the non-AP station.

Figure 13:
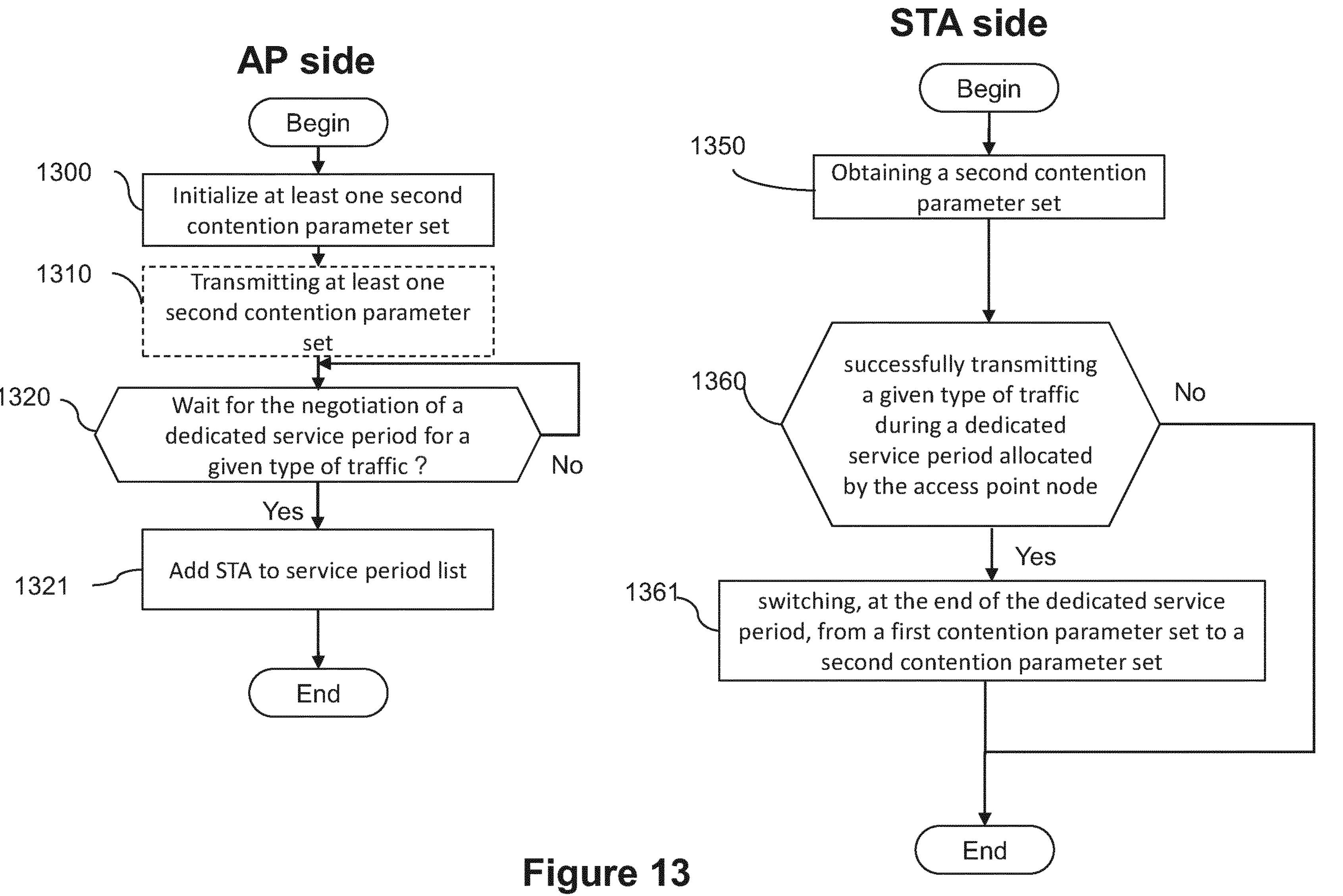
FIG. 13 illustrates a general flowchart covering all the embodiments described within the present document.

A general embodiment, covering embodiments described hereinafter, is illustrated in FIG. 13.

On the AP side, at first at step 1300, the AP initializes, according to a fairness policy implemented at the AP, a second contention parameter set, to be used by a non-AP station to access the medium through EDCA. According to some embodiments, several second contention parameter sets are initialized at step 1300.

Then, at step 1310, the contention parameter set is transmitted to a non-AP station. According to some embodiments, the step 1310 is optional.

Next, the AP, at step 1320, takes part to a negotiation process, in order to reserve a specific time period, for transmitting a given type of data. As explained hereinbefore, TWT may be used, in order to specify a dedicated service period for the transmission of the given type of data.

During this negotiation, the non-AP station, having the given type of data awaiting to be transmitted, may exchange data with the AP, in order to signal its willing to transmit data during the dedicated service period.

According to some embodiments, the non-AP station, having the given type of traffic awaiting to be transmitted may, before the negotiation process, provide to the AP, its willing to transmit during a dedicated period. For example, the non-AP station may provide TIDs of the traffic queues at the non-AP station, having data of the given type awaiting to be transmitted.

In this case, at step 1321, the AP register the non-AP station in the service period list, indicating all the non-AP station that plan to transmit data of the given type, during the dedicated service period.

On the non-AP station side, at step 1350, a second contention parameter set is obtained. The obtention may comprise determining locally the second contention parameter set or selecting from at least one second contention parameter set received from the AP (corresponding to step 1310). The AP may select one second contention parameter set to be transmitted (using a beacon frame or TWT negotiation process) and to be used by the non-AP station. In a variant, the AP may transmit a plurality of second contention parameter sets from which one set is selected by the non-AP station.

Then, at step 1360, if the non-AP station successfully transmits data of the given type during the dedicated service period, then at step 1361, the non-AP station then modify its current contention parameter set. The non-AP station thus use the second contention parameter set instead of the current contention parameter set, at the end of the dedicated service period. If during the dedicated service period, the non-AP station did not have the opportunity to transmit its data of the given type awaiting to be sent, or did not successfully transmits this data, then the current contention parameter set is maintained, and the second contention parameter set is not applied by the non-AP station.

Now, in reference with FIGS. 6 to 11, several variants are described.

Figure 6:
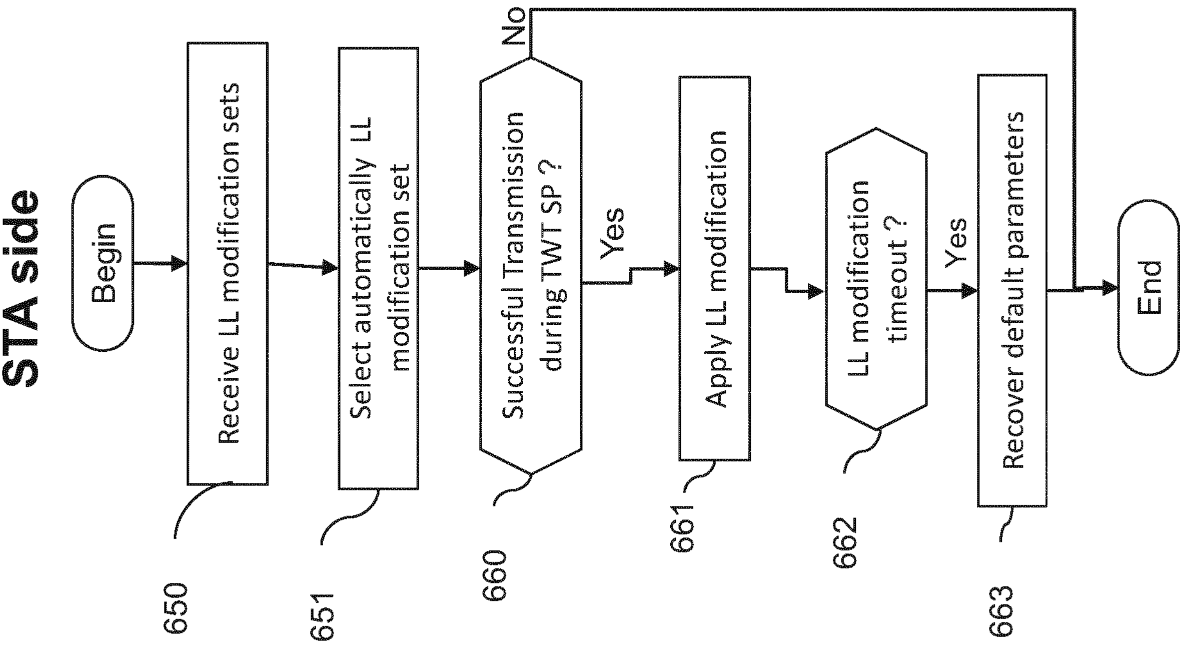
FIG. 6 illustrates, using a flowchart, a first embodiment describing operations of the AP and the non-AP station (STA) according to a first embodiment of the invention.
Figure 6:
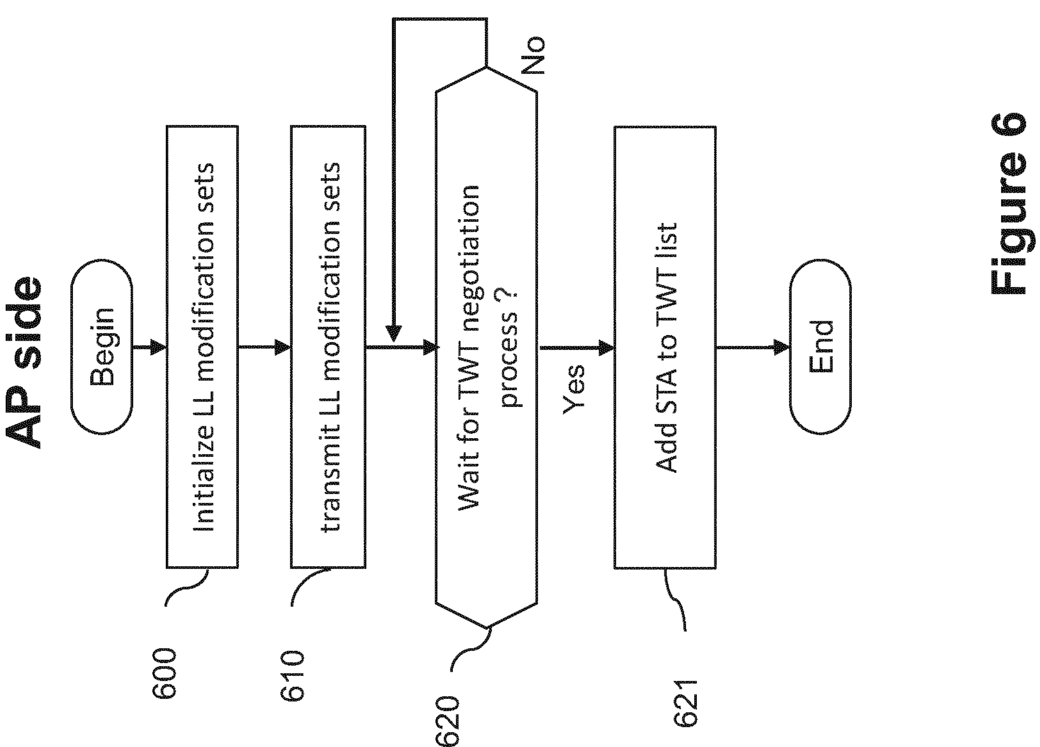

FIG. 6 illustrates, using a flowchart, a first embodiment describing operations of the AP and the STA. Such embodiment is considered as a default mode, in which the non-AP station, automatically selects, among the second EDCA parameter sets provided by the AP, using the selection criterion mention hereinbefore.

Before the beginning of the algorithm, at the non-AP station side, several first EDCA parameter sets, comprising contention parameters for each traffic queue handled by the station, are used for accessing the medium.

First, at step 600, at the AP side, the one or more second EDCA parameter sets are initialized, meaning that values of the parameters are chosen. As explained hereinbefore, EDCA parameter set is provided, and comprises contention parameters at least for each traffic queue, associated with an AC. Therefore, at this step, several second EDCA parameter sets may be provided.

According to some embodiments, for each traffic queue, one or several second EDCA parameter sets may be provided, such that one may be selected according to selection criterions.

Then, once initialized, the second EDCA parameter sets are sent to the non-AP station at step 610, using the LL IE 500, as illustrated in FIG. 5, included in a management frame, e.g. a beacon frame.

At step 620, the AP waits for the negotiation process in order to define a service period LL TWT SP, dedicated for the transmission of LLRS traffic. During the negotiation, the AP notably determine, through exchanges with the station, non-AP station having data to be sent during the LL TWT. According to some embodiments, the AP may have a LL TWT member list, including the information relating the non-AP stations, e.g. the associate AID, which plan to send LLRS traffic during the LL TWT SP.

As explained hereinbefore, in case of a broadcast LL TWT SP, using an enhanced TWT IE, the non-AP station having LLRS traffic may respond to the AP, with a standardized TWT IE or an enhanced TWT IE, to indicate that it wants to take part to the broadcast TWT. In this case, upon a receive request from a non-AP station, the AP may add station as a member of the LL TWT member list, at step 621.

In case of an individually agreed TWT, the non-AP, having LLRS traffic, requests to be a part of a LL TWT SP, and in response, the AP may send an enhanced TWT IE, indicating information relating to the LL TWT SP that the AP proposes to the non-AP stations, together with information relating to second EDCA parameter sets and conditions for applying said second EDCA parameter sets. When the AP sends the information relating to the LL TWT SP, it also, in parallel, adds the non-AP station to the LL TWT member list, at step 621.

According to an alternative, the LL TWT SP may be imposed to some stations, in this case, after sending information relating to the LL TWT SP using the enhanced TWT IE to the concerned non-AP stations, these stations are automatically added within the LL TWT member list at step 621. In this case, any following response of the non-AP stations are not considered by the AP.

At the non-AP station side, default EDCA parameter set are specified, also referred to as first EDCA parameter sets. Such first EDCA parameter sets, comprises initial contention parameters for each traffic queue, may be provided by the AP, e.g. during an initialization phase, within a management frame, e.g. a beacon frame.

At the non-AP station side, upon the reception of the second EDCA parameter set(s) from the AP (see step 650), the non-AP station automatically selects at step 651, for each LLRS traffic, the corresponding second EDCA parameters, based on selection criterion.

Selection criterion may be related to the local traffic characteristics.

According to some embodiments, the selection criterion may be the mean data rate requirement and/or the maximum time interval requirements of the LLRS traffic to be transmitted during the LL TWT SP. The values of the selection criterions, mean data rate requirement and maximum time interval requirement, may be found in the TSPEC Information Element or the TCLAS Information Element, provided by the non-AP station, in the background. The TSPEC IE and the TCLAS IE may be used by the non-AP stations, to describe traffic queues they manage, as described in the 802.11 standard subclauses 9.4.2.29 and 9.4.2.30.

Then, during the LL TWT SP, the first EDCA parameter set is used by the non-AP station for an associated traffic queue considered as LLRS traffic queue. Thus, the non-AP station contends for accessing the medium for sending data of the considered traffic queue. In case of the non-AP station comprises several traffic queues considered as LLRS traffic, the contention is performed independently for each concerned traffic queue.

Upon a successful transmission of LLRS data of a given LLRS traffic during the LL TWT SP, at step 660, the non-AP station change the first EDCA parameter set, used previously for accessing the medium, into the selected second EDCA parameter set, for a given predetermined time period at the end of the LL TWT SP. Thus, the LLEDCATimer associated with the traffic queue, particularly with the access category of the traffic queue, is launched, to count this predetermined time period.

Advantageously, the second EDCA parameter set may comprise modified contention parameters only for the traffic queues having transmitting LLRS data during the LL TWT SP. Thus, only the probability of accessing the medium of the traffic queues, having transmitted LLRS data during the LL TWT SP, is modified. Advantageously, provided second EDCA parameter set are determined in order to reduce the chance of accessing the medium for the given traffic queues.

When the LLEDCATimer elapses, at step 662, then the non-AP station restores, for the concerned traffic queues, the default EDCA parameters, i.e. the first EDCA parameter sets associated with the respective traffic queue.

If no LL data (i.e. LLRS traffic) are transmitted during the LL TWT SP for a given traffic queue, then, as illustrated with the “NO” branch, the first EDCA parameter set is maintained, and the algorithm ends.

According to some embodiments, at step 660, if the non-AP station is further enrolled in subsequent LL TWT SP when applying the second EDCA parameter set, and that the non-AP station access the medium using the second EDCA parameter set for transmitting LLRS traffic, then the second EDCA parameters are maintained, and the LLEDCATimer is reinitialized for counting, again, the predetermined time period. Such embodiments may be advantageously, notably when a lot of non-AP stations are involved in both LL TWT SPs, and that some of the non-AP stations failed to transmit during the first LL TWT SP.

Figure 7:
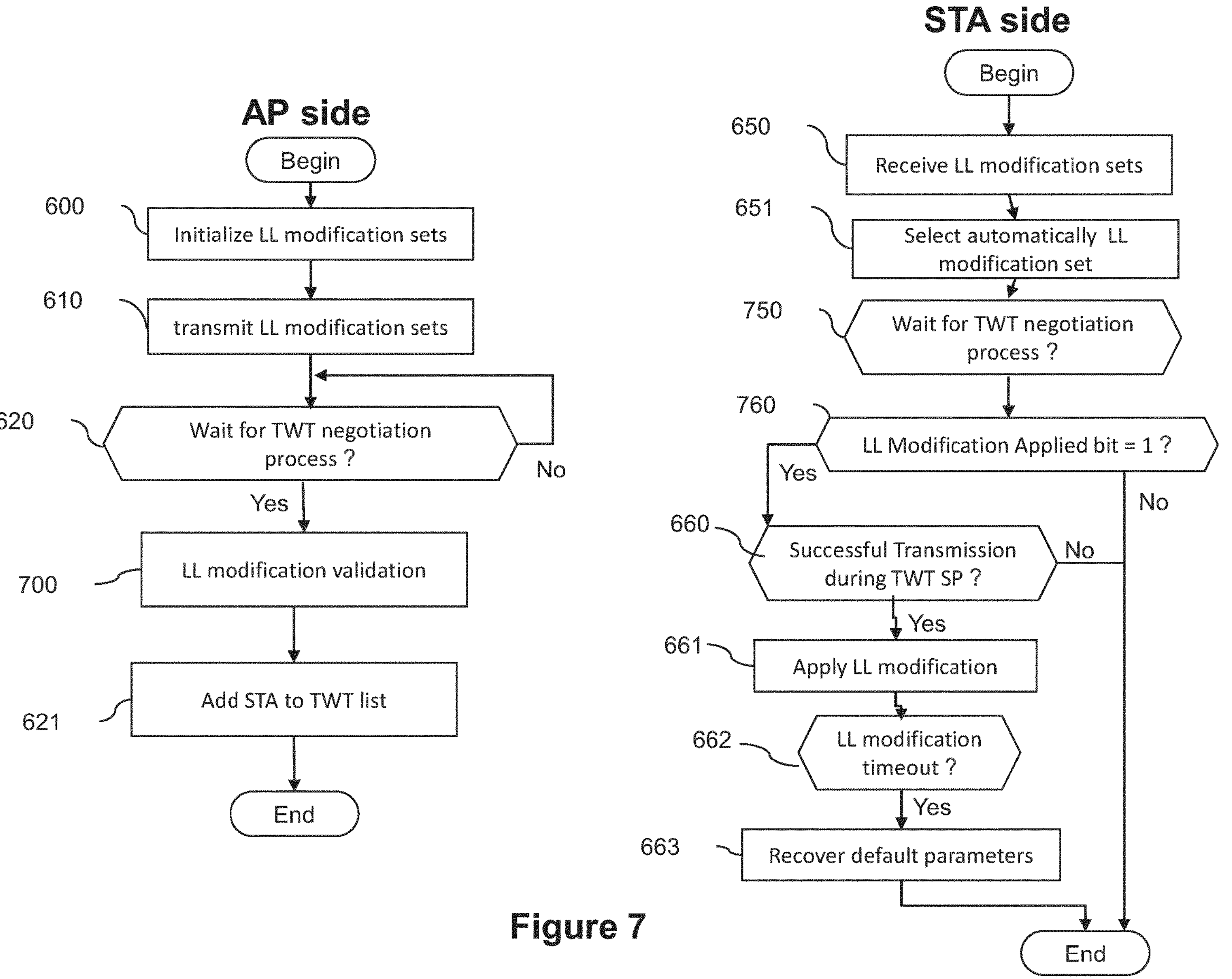
FIG. 7 illustrates, using a flowchart, a second embodiment describing operations of the AP and the non-AP station (STA)

FIG. 7 illustrates, using a flowchart, a second embodiment describing operations of the AP and the STA, in which, considering the overall of the network during the negotiation process, the AP may suspend the use of the second EDCA parameter set.

Indeed, in certain conditions, for example when the global load of the network is low, in order to optimize the use of the bandwidth, the AP may choose not to penalize a non-AP station which has previously access the medium for transmitting LLRS traffic, during a LL TWT SP. Such mechanism enables the AP to allow the non-AP stations, having previously send LLRS data during LL TWT SP, to contend, without reducing their probability to access the medium, when the state of the bandwidth of the network allows it. In other words, the AP is in charge of managing the fairness policy thanks to the tools provided herein.

Compared to the previous embodiment illustrated in FIG. 6, the present embodiment proposes the use of the LL modification Applied bit 413 comprises within the enhanced TWT IE 300. Therefore, step 700 on the AP side, and steps 750 and 760 on the non-AP side, are added to the previously described embodiment of FIG. 6.

According to another embodiment, the AP may use a TWT information frame (as described the subclauses 9.6.24.12 and 9.4.1.60) wherein a new bit can be added and played the same role as the “LL modification Applied” bit 413.

Steps 600 to 620 are the same as the ones previously described with reference to FIG. 6.

During the LL TWT negotiation process, which begins at step 620, the AP uses the LL Modification Applied bit 413 indicating to the non-AP station if it shall or not use the selected second EDCA parameter sets, at step 700. In other words, the LL Modification Applied bit 413 allows the suspension of the application of the second EDCA parameter sets for all the traffic having LLRS traffic to be sent during the LL TWT SP.

In case of a broadcast LL TWT or imposed, the AP uses the enhanced TWT IE 300 when broadcasting information relating to LL TWT or sending information relating to the LL TWT to the concerned stations within a management, e.g. a beacon frame.

In case of individually agreed LL TWT, in response to a request from a non-AP station or when proposing a LL TWT to a non-AP station, the enhanced TWT IE 300 is used.

The LL modification applied bit 413 may be set to '1' or '0', for respectfully indicating:

- that the second EDCA parameter set selected by the non-AP station at step 651, shall be applied, upon a successful transmission of LLRS traffic of a given traffic queue and at the end of the LL TWT SP, for a predetermined time period, in order to reduce the probability of the traffic queue to subsequently access the medium.
- that the first EDCA parameter set selected by the non-AP station at step 651, shall not be applied in view of the network operating conditions, where the network operating conditions are determined during the negotiation process.

Therefore, at the non-AP station side, after having selected the second EDCA parameter set, for each LLRS traffic of the non-AP station, then the non-AP station waits for the negotiation process, and the reception of a management frame containing an enhanced TWT IE 300, included the LL Modification Applied bit.

According to the value of the LL Modification Applied bit, the non-AP either uses the second EDCA parameter set at the non-AP station for a given predetermined time period, or maintains the first EDCA parameter set (default parameters).

The main advantage of this embodiment, i.e. the use of the LL Modification Applied bit 413, is to consider not only the local requirements of the non-AP station, but more globally the operation condition of the network, e.g. the global load of the network.

Thus, if the global load of the network is low, the AP can suspend the use of the second EDCA parameter set at the non-AP station to optimize the bandwidth usage.

According to some embodiments, the TWT IE 300 may be sent by the AP after the TWT negotiation process to update the validation status if the global load of the network evolves (higher or lower). Thus, the suspension of the use of the second EDCA set parameters may be suspended according the evolution of the network load.

Figure 8:
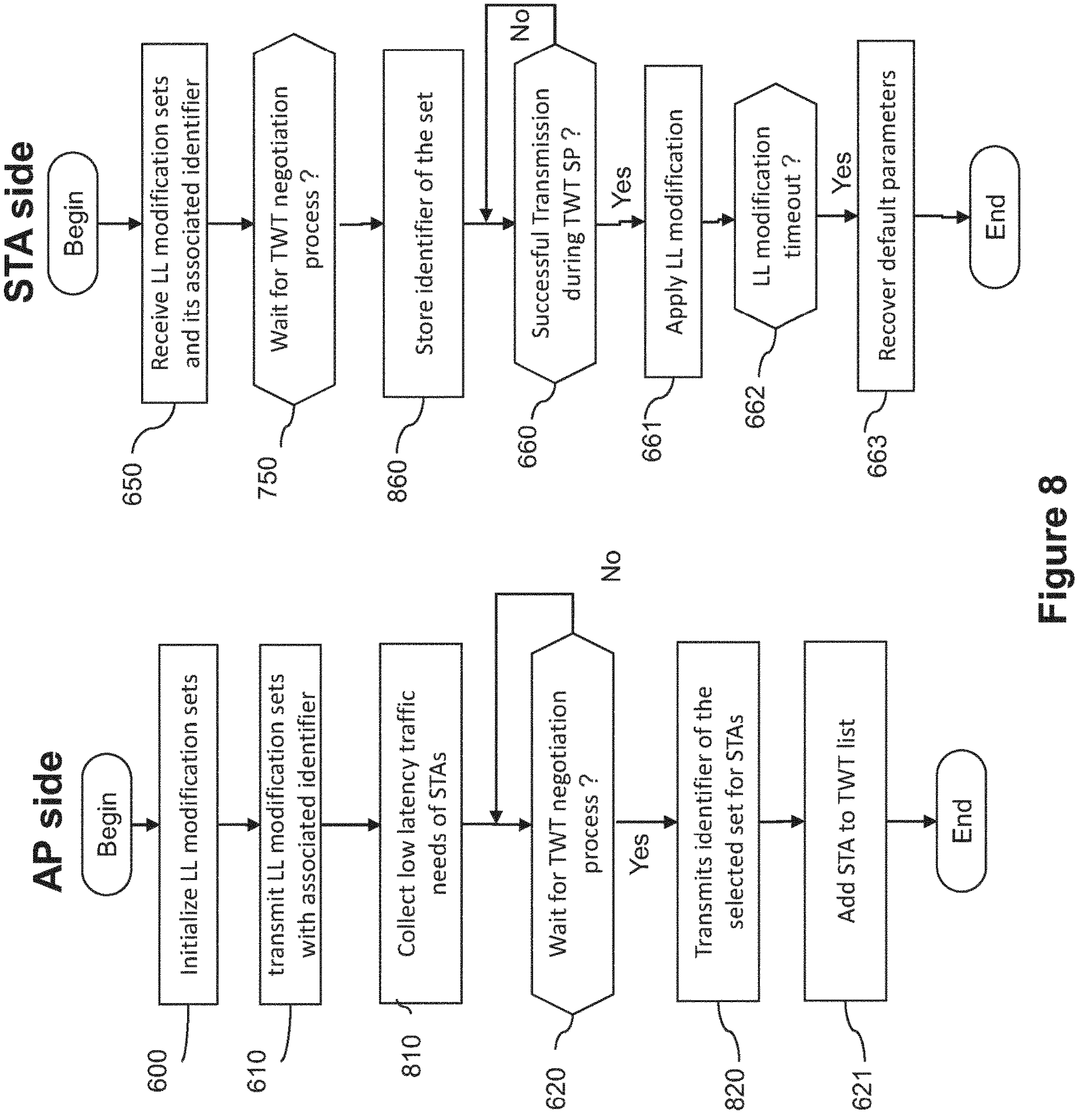
FIG. 8 illustrates, using a flowchart, a third embodiment describing operations of the AP and the non-AP station (STA)

FIG. 8 illustrates, using a flowchart, a third embodiment describing operations of the AP and the non-AP station, in which the selection of the second EDCA parameter set, is performed at the AP side, for each traffic queues having LLRS data to transmit.

At step 600, the AP first initializes the second EDCA parameter sets, and transmits them at step 610 to the non-AP station, as described previously. In this embodiment, the second EDCA parameter sets are transmitted with an associated identifier, uniquely identifying each transmitted second EDCA parameter set.

Non-AP stations having data to transmits, require bandwidth in the background using TSPEC IE or the TCLAS IE. Both TCLAS and TSPEC IEs are used by the non-AP station to provide the AP with information describing the traffic queues, as described in the 802.11 standard subclauses 9.4.2.29 and 9.4.2.30. Thus, it may be indicated for each traffic queue, whether it contains LLRS traffic, and the specific needs associated with such data transmission. Receiving such TCLAS and/or TSPEC IEs, the AP collects, at step 810, the traffic queue containing LLRS data awaiting to be sent, and the requirements associated with their sending.

During the TWT negotiation process, in case of an individually agreed LL TWT, at step 810, the AP transmits to the STAs, which wants to participate to the LLTWT SP, an identifier identifying the second EDCA parameter set, chosen by the AP considering its analysis of the network conditions, e.g. non-AP stations requirements, the load of the network, etc.

In case of an imposed LL TWT, the identifier may be sent together with information relating to the LL TWT, using the enhanced TWT IE 300.

In either cases:

the LL modification Applied bit 413 is reserved;

Low Latency Traffic Info Present bit 414 is set to 1 indicating that the "Low Latency Traffic Info" field 440 has valid information, i.e. valid identifier of the second EDCA parameter set.

Low Latency Traffic Info field 440 contains the identifier of the selected second EDCA parameter set.

Next, the AP adds the non-AP station to the LL TWT member list and stores the identifier of the second EDCA parameter set, at step 621.

At the non-AP station side, at step 750, the non-AP station waits for the negotiation process in order to receive, the selected second EDCA parameter set to be applied at the non-AP station, upon a successful LLRS transmission during the LL TWT SP and after the LL SP. The identifier is then store at step 860, and the associated second EDCA parameter set is used at step 661.

Such embodiment, has several advantages. First, having the AP selecting the second EDCA parameter set to be used, enables to choose second EDCA parameters both adapted to the local conditions of the station (i.e. the amount of data waiting to be sent) and more globally to the situation of the network (to optimize the use of the bandwidth). Secondly, having the selection of the second EDCA parameter set at the AP side, improves the reliability of the mechanism and avoids extra overhead of the second EDCA parameter sets.

Figure 9:
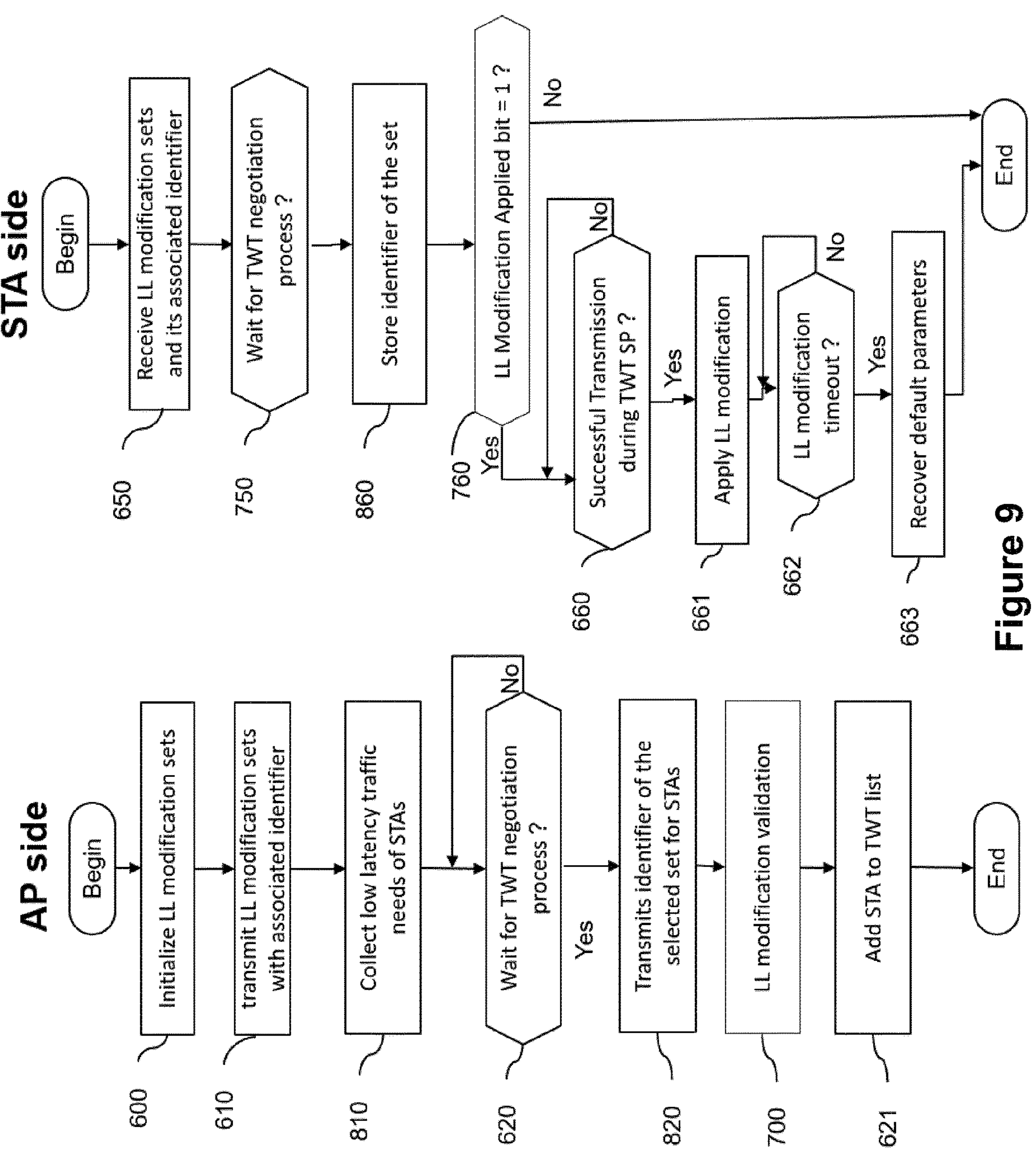
FIG. 9 illustrates, using a flowchart, a fifth embodiment describing operations of the AP and the non-AP station (STA)

FIG. 9 illustrates, using a flowchart, a fifth embodiment describing operations of the AP and the STA, similar to the embodiment described in relation with FIG. 8, where it is further implemented the use of the "LL Modification Applied" bit 413 in order to suspend the application of the second EDCA parameter set.

As visible on FIG. 9, at the AP side, after transmitting the identifier of the selected second EDCA parameter set, an additional step 700 is performed (identical to the one of FIG. 7), during which, considering the network conditions, e.g. the global load of the network increases or decreases, the AP receives traffic requirements from other STAs, etc., the AP may send, within an enhanced TWT IE, an indication regarding the suspension or not of the application of the second EDCA parameter set.

Such embodiments enable the AP to drive in a more fined-tune way the application of the fairness countermeasures, accordingly to the network global conditions.

In a variant, the selection of the second EDCA parameter set is performed by the non-AP station. In this case, similarly to step 651, the STA choose a second EDCA parameter set, and transmits to the AP, the associated identifier, as a proposal, during the negotiation process. Then, in view of the selected EDCA parameter set together with the network conditions, the AP determine whether or not suspending the application of the second EDCA parameter set, using the LL Modification Parameter bit 413.

Figure 10:
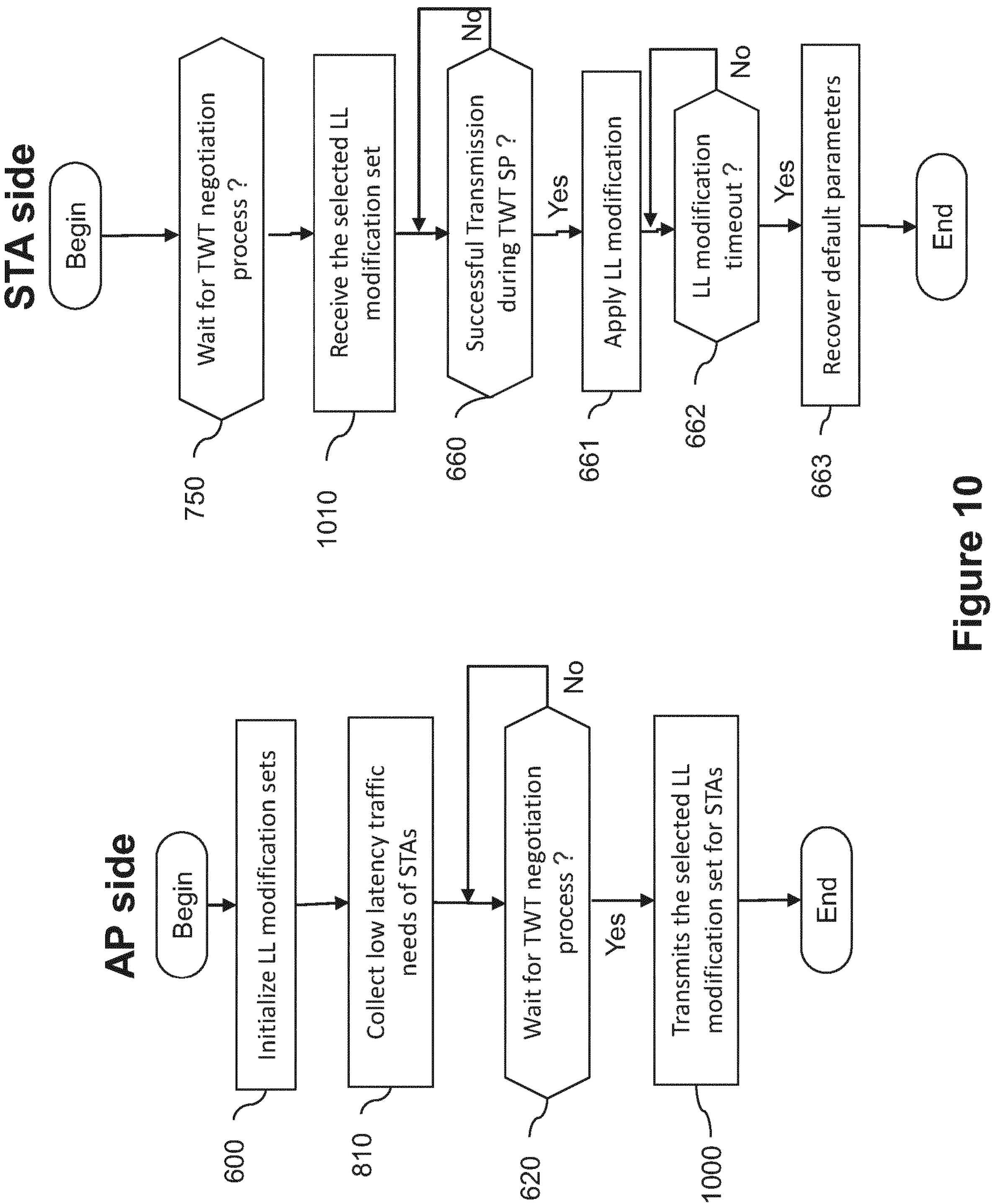
FIG. 10 illustrates, using a flowchart, a sixth embodiment describing operations of the AP and the non-AP station (STA)

FIG. 10 illustrates, using a flowchart, a sixth embodiment describing operations of the AP and the STA, where only the second EDCA parameter set selected by the AP is transmitted to the non-AP.

In this embodiment, at the AP side, after initializing the second EDCA parameter sets, the AP, at step 810 (please refer to the corresponding step of FIG. 8), collects from the non-AP station, their requirements regarding LLRS traffic, i.e. information indicating that the non-AP station has one or more traffic queue with LLRS data.

Then, during the TWT negotiation process at step 620 (see corresponding step of FIG. 6), in step 1000, the AP selects the second EDCA parameter set, as explained in relation to FIGS. 8 and 9, and send the select second EDCA second parameters set to the non-AP station.

After receiving the second EDCA parameter set at step 1010, and provided that the conditions are met (i.e. see step 660), then the selected EDCA parameter set is applied at the node.

Such embodiment is advantageous, as only the second EDCA parameter set(s) to be applied is(are) transmitted to the non-AP station, therefore reducing the overhead. Besides, it helps saving memory storage at the non-AP station side, as only one second EDCA parameter set is stored.

Figure 11:
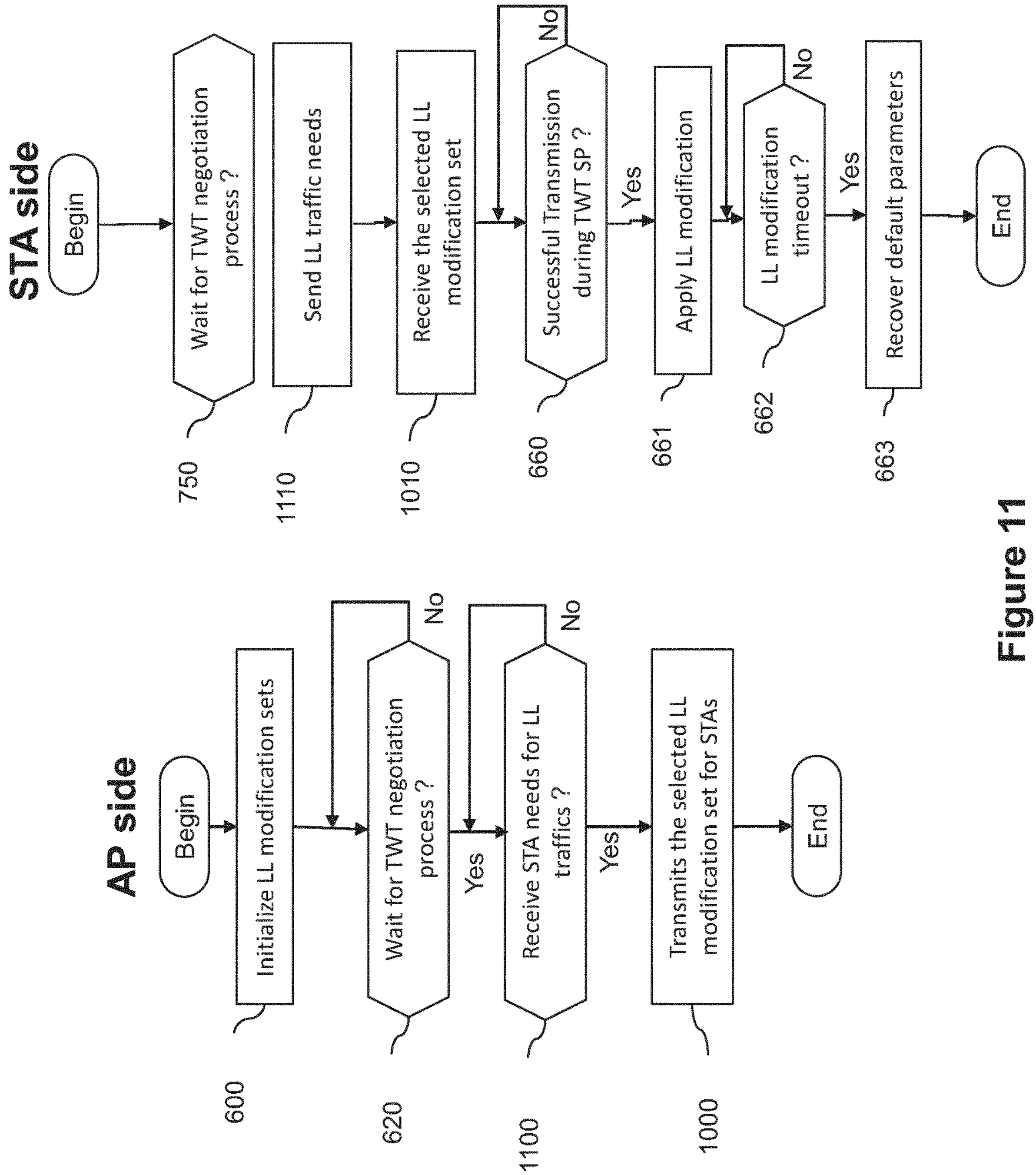
FIG. 11 illustrates, using a flowchart, a seventh embodiment describing operations of the AP and the non-AP station (STA)

FIG. 11 illustrates, using a flowchart, a seventh embodiment describing operations of the AP and the non-AP station in which, the requirements of non-AP stations regarding their LLRS traffic, i.e. information indicating that the non-AP station has one or more traffic queue with LLRS data, is performed during the negotiation process.

Such collection may be performed during the LL TWT negotiation process, step 620, during which the non-AP station provides the AP with information relating their traffic queues having LLRS to be sent, using an enhanced TWT IE 300. The DL/UL TID Bitmap field 420/430 are used, in order to indicate, for each traffic queue, whether or not it contains LLRS data. For example, TIDs of the traffic queue containing LLRS data are provided thanks to the DL/UL TID bitmaps 420/430. Unlike the embodiment illustrated in FIG. 8, in which the collection of traffic queues having LLRS traffic to be sent using TCLAS and TSPEC IE, the collection is performed during the negotiation process, enabling to have data that best reflect the current situation at the station level.

Figures 12A, 12B:
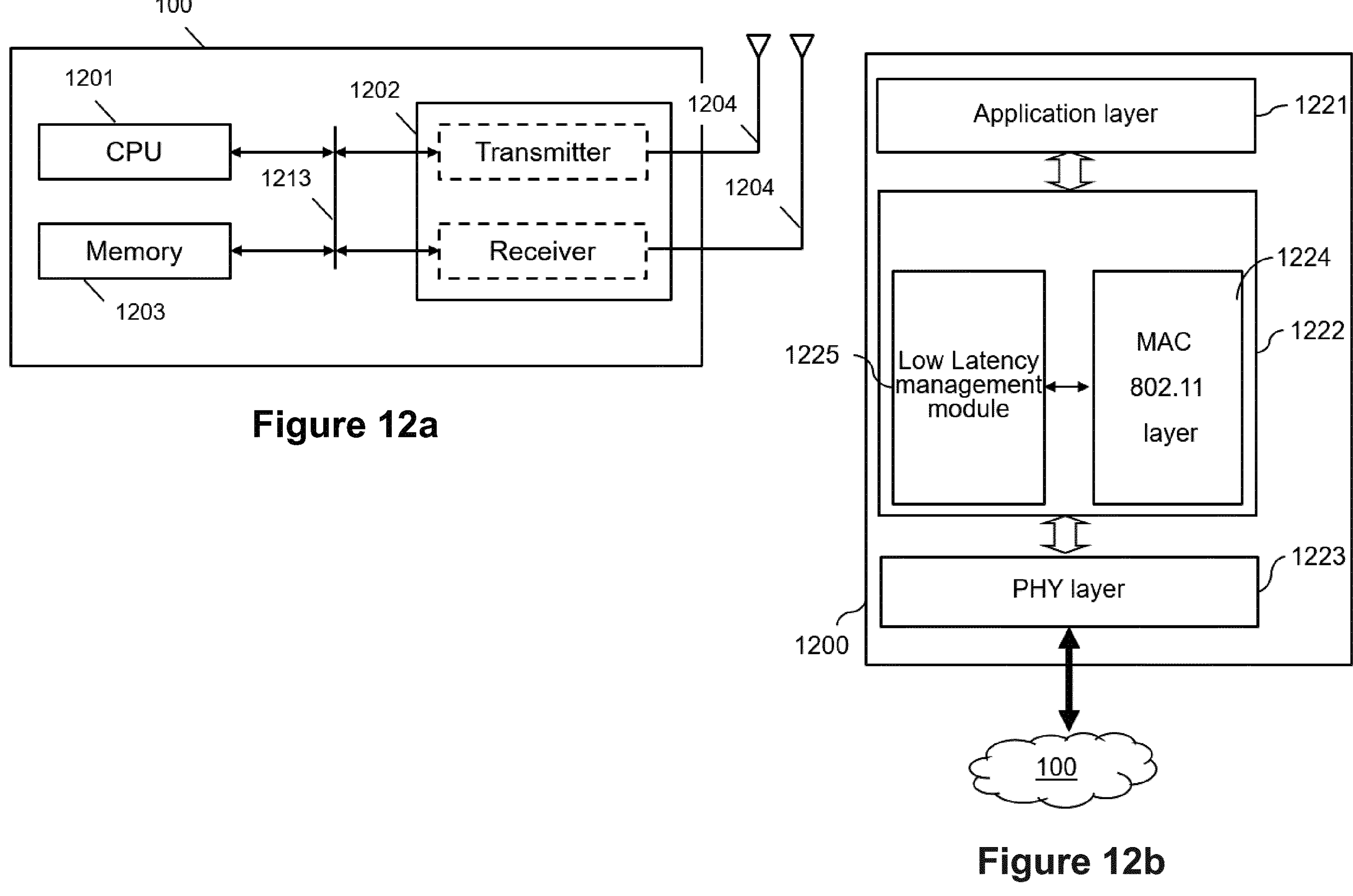
FIG. 12*a* schematically illustrates a communication device.
FIG. 12*b* is a block diagram schematically illustrating the architecture of the communication device.

The different illustrated embodiments may be performed by the communication devices, as the one described in relation with FIGS. 12*a* and 12*b*.

FIG. 12*a* schematically illustrates a communication device 1200, either a non-AP station 101-107 or the access point 110, of the radio network 100, configured to implement at least one embodiment of the present invention. The communication device 1200 may preferably be a device such as a micro-computer, a workstation or a light portable device. The communication device 1200 comprises a communication bus 1213 to which there are preferably connected:

- a central processing unit 1201, such as a processor, denoted CPU;
- a memory 903 for storing an executable code of methods or steps of the methods according to embodiments of the invention as well as the registers adapted to record variables and parameters necessary for implementing the methods; and
- at least one communication interface 1202 connected to a wireless communication network, for example a communication network according to one of the IEEE 802.11 family of standards, via transmitting and receiving antennas 1204.

Preferably the communication bus provides communication and interoperability between the various elements included in the communication device 1200 or connected to it. The representation of the bus is not limiting and in particular the central processing unit is operable to communicate instructions to any element of the communication device 1200 directly or by means of another element of the communication device 1200.

The executable code may be stored in a memory that may either be read only, a hard disk or on a removable digital medium such as for example a disk. According to an optional variant, the executable code of the programs can be received by means of the communication network, via the interface 1202, in order to be stored in the memory of the communication device 900 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 12*b* is a block diagram schematically illustrating the architecture of the communication device 900, either the AP 110 or one of stations 101-107, adapted to carry out, at least partially, the invention. As illustrated, device 1200 comprises a physical (PHY) layer block 1223, a MAC layer block 1222, and an application layer block 1221.

The PHY layer block 1223 (here an 802.12 standardized PHY layer) has the task of formatting, modulating on or demodulating from any 20 MHz channel or the composite channel, and thus sending or receiving frames over the radio medium used 100.

The MAC layer block or controller 1122 preferably comprises an 802.11 MAC layer 1124 implementing conventional 802.11ax MAC operations, and additional block 1125 for carrying out, at least partially, the invention. The MAC layer block 1122 may optionally be implemented in software, which software is loaded into RAM 1112 and executed by CPU 1111.

Preferably, the additional block 1125, referred to as Low Latency management module implements the part of embodiments of the invention (either from station perspective or from AP perspective).

802.11 MAC layer 1124, Low Latency management module 1125 interact one with the other in order to process accurately the starting and management of the Low Latency Service Periods according to embodiments of the invention.

On top of the Figure, application layer block 1121 runs an application that generates and receives data packets, for example data packets such as a video stream. Application layer block 1121 represents all the stack layers above MAC layer according to ISO standardization.

The invention claimed is:

1. A communication method in a communication network comprising a plurality of nodes connected to at least one access point node, the nodes being able to transmit data of a first access category, AC, outside Target Wake Time, TWT, service periods, SPs, on at least one communication channel using a contention access method according to a contention parameter set associated with the first AC, the method comprising, at a node:

transmitting data of the first AC during a dedicated TWT SP allocated by the access point node, and after a successful transmission of the data of the first AC during the dedicated TWT SP, switching, at the end of the dedicated TWT SP, from a first contention parameter set associated with the first AC to a second contention parameter set associated with the first AC, for contention access to the communication channel to transmit data of the first AC, whereas in case of unsuccessful transmission of the data of the first AC during the dedicated TWT SP, the first contention parameter set associated with the first AC is maintained at the end of the dedicated TWT SP, for contention access to the communication channel to transmit data of the first AC.

2. The communication method of claim 1 further comprising:

switching back to the first contention parameter set after a predetermined time period.

3. The method of claim 2, wherein the predetermined period is a defined by a LLEDCATimer value included within the second contention parameter set.

4. The communication method of claim 1, wherein the second contention parameter set reduces a probability for the node to access the communication channel through contention to transmit data of the first AC.

5. The communication method of claim 1, further comprising receiving a beacon frame from the access point node, the beacon frame broadcasting network information about the communication network to the plurality of nodes, wherein a received beacon frame includes at least one second contention parameter set.

6. The communication method of claim 5, wherein the received beacon frame includes a plurality of second contention parameter sets associated with respective selection criterions, and the method further comprises, at the node:

selecting a second contention parameter set from the plurality, to be applied for the switching, based on associated selection criterions.

7. The method of claim 6, wherein the associated selection criterions are a requirement of the first AC to be transmitted during the dedicated TWT SP, such as a mean data rate or a maximum time interval.

8. The method of claim 1, further comprising, before the transmission:

negotiating with the access point node to be allowed to transmit data of the first AC within the dedicated TWT SP.

9. The method of claim 8, wherein the switching is conditional to the receiving of a command from the access point node during the negotiation, validating the switch using the second contention parameter set.

10. The method of claim 9, wherein the method further comprises, during the negotiation:

providing to the access point node, information relating to a traffic queues having data of the first AC awaiting to be sent at the node.

11. The method of claim 10, wherein the information relating to traffic queues is a traffic identifier.

12. The method of claim 1, wherein the method further comprises:

providing, before the transmission, to the access point node, information relating to a traffic queues having data of the first AC awaiting to be sent at the node;

receiving, during the negotiation, from the access point an information relating to a selected second contention parameter set to be applied for the switching.

13. The method of claim 12, wherein in the beacon frame, each second contention parameter set is associated with a unique identifier, and the received information relating to a selected second contention parameter set to be applied is an identifier associated with the selected second contention parameter set.

14. The method of claim 12, wherein information relating to a traffic queues having data of the first AC awaiting to be sent is provided within a TWT information element in an uplink frame.

15. The method of claim 1, wherein the first AC is related to low latency traffic.

16. The method of claim 1, wherein the second contention parameter set is based on a requirement of data of the first AC to be transmitted during the dedicated TWT SP.

17. A communication method in a communication network comprising a plurality of nodes connected to at least one access point node, the nodes being able to transmit data of a first access category, AC, outside Target Wake Time, TWT, service periods, SPs, on at least one communication channel using a contention access method according to a contention parameter set associated with the first AC, the method comprising, at the access point node:

transmitting information relating to the at least one second contention parameter set associated with the first AC to a node, allocating a dedicated TWT SP for transmission of data of the first AC;

wherein the second contention parameter set is intended to be used by the node at the end of the dedicated TWT SP, and after a successful transmission of the data of the first AC during the dedicated TWT SP instead of a first contention parameter set associated with the first AC and intended to be used by the node for contention access to the communication channel to transmit data of the first AC, whereas in case of unsuccessful transmission of the data of the first AC during the dedicated TWT SP, the first contention parameter set associated with the first AC and intended to be used by the node for contention access to the communication channel to transmit data of the first AC is maintained at the end of the dedicated TWT SP.

18. The method of claim 17, further comprising:

before the data transmission, negotiating with the node for allowing the node to transmit data of the first AC within the dedicated TWT SP.

19. The method of claim 18, further comprising, during the negotiation:

collecting from the node information relating to a traffic queues having data of the first AC awaiting to be sent;

selecting a second contention parameter set, from a retrieved at least one second contention parameter set, based on predetermined selection criterions and the collection results;

transmitting the selected second contention parameter set to the node.

20. The method of claim 19, wherein information relating to a traffic queues having data of the first AC awaiting to be sent is provided within a downlink frame, such as a TSPEC frame or a TCLAS frame.

21. The method of claim 18, wherein the transmitted information comprises information relating to a plurality of second contention parameter sets, the method further comprising:

sending a command to the node during the negotiation validating or suspending the use of one of the second contention parameter sets, based on a received information relating to a second contention parameter set selected by the node.

22. The method of claim 17, further comprising:

collecting from the node information relating to a traffic queues having data of the first AC awaiting to be sent;

selecting a second contention parameter set, from a retrieved at least one contention parameter set based on predetermined selection criterions and the collection results.

23. The method of claim 22, wherein the transmitted information relating to the at least one second contention parameter set comprises the selected second contention parameter set.

24. The method of claim 22, wherein the transmitted information comprises information relating to a plurality of second contention parameter sets each associated with an identifier, and the method further comprises, after the selection:

transmitting the identifier associated with the selected second contention parameter set.

25. The method of claim 24, further comprising:

sending a command to the node during the negotiation validating or suspending the use of one of the second contention parameter sets, based on the selected contention parameter set.

26. The method of claim 17, wherein the first AC is related to a low latency traffic.

27. A communication device forming a node in a communication network comprising a plurality of nodes connected to at least one access point node, the nodes being able to transmit data of a first access category, AC, outside Target Wake Time, TWT, service periods, SPs, on at least one communication channel using a contention access method according to a contention parameter set associated with the first AC, the communication device forming the node comprising a microprocessor configured for carrying out the following steps:

transmitting data of the first AC during a dedicated TWT SP allocated by the access point node, after a successful transmission of the data of the first AC during the dedicated TWT SP, switching, at the end of the dedicated TWT SP, from a first contention parameter set associated with the first AC to a second contention parameter set associated with the first AC for contention access to the communication channel to transmit data of the first AC.

28. An access point in a communication network comprising a plurality of nodes connected to the access point, the nodes being able to transmit data of a first access category, AC, outside Target Wake Time, TWT, service periods, SPs, on at least one communication channel using a contention access method according to a contention parameter set associated with the first AC, the access point being characterized in that it comprises at least one microprocessor configured for carrying out the following steps:

transmitting information relating to the at least one second contention parameter set associated with the first AC to a node, allocating a dedicated TWT SP for transmission of data of the first AC;

wherein the second contention parameter set is intended to be used by the node at the end of the dedicated TWT SP, and after a successful transmission of the data of the first AC during the dedicated TWT SP, instead of a first contention parameter set associated with the first AC and intended to be used by the node for contention access to the communication channel to transmit data of the first AC, whereas in case of unsuccessful transmission of the data of the first AC during the dedicated TWT SP, the first contention parameter set associated with the first AC and intended to be used by the node for contention access to the communication channel to transmit data of the first AC is maintained at the end of the dedicated TWT SP.

* * * * *